United States Patent [19]

Sawada et al.

[11] Patent Number: 5,496,117
[45] Date of Patent: Mar. 5, 1996

[54] TAPE PRINTER

[75] Inventors: Akihiro Sawada, Nagoya; Masaharu Mori, Anjyo; Kazuaki Koie, Tokoname; Kazuko Ishida, Konan, all of Japan

[73] Assignee: Brother Kogyo Kabushiki Kaisha, Aichi, Japan

[21] Appl. No.: 348,111

[22] Filed: Nov. 25, 1994

[30] Foreign Application Priority Data

Nov. 24, 1993 [JP] Japan .................................. 5-319133
Dec. 27, 1993 [JP] Japan .................................. 5-349583

[51] Int. Cl.⁶ ...................................................... B41J 5/30
[52] U.S. Cl. ............................ 400/61; 400/586; 400/103
[58] Field of Search ........................... 400/103, 61, 615.1, 400/586, 62, 70, 104; 101/72

[56] References Cited

U.S. PATENT DOCUMENTS

| | | |
|---|---|---|
| 4,641,347 | 2/1987 | Clark et al. . |
| 4,746,932 | 5/1988 | Sato . |
| 4,807,177 | 2/1989 | Ward ...................................... 364/900 |
| 4,829,568 | 5/1989 | Clark et al. . |
| 5,025,397 | 6/1991 | Suzuki . |
| 5,184,900 | 2/1993 | Eisner et al. . |
| 5,188,464 | 2/1993 | Aaron . |
| 5,188,469 | 2/1993 | Nagao et al. . |
| 5,395,173 | 3/1995 | Ueno et al. ................................ 400/83 |

FOREIGN PATENT DOCUMENTS

| | | |
|---|---|---|
| 0364305 | 4/1990 | European Pat. Off. . |
| 61-883 | 1/1986 | Japan . |
| 61-130068 | 6/1986 | Japan . |
| 2-106555 | 4/1990 | Japan . |
| 5-185695 | 7/1993 | Japan . |
| 5-177898 | 7/1993 | Japan . |
| 2228811 | 9/1990 | United Kingdom . |

OTHER PUBLICATIONS

"Bar Code Printing for Improved Reliability", K. L. Bobart et al., *IBM Technical Disclosure Bulletin*, vol. 24, No. 8, 1982, pp. 4326–4330.

*Primary Examiner*—Ren Yan
*Assistant Examiner*—John S. Hilten
*Attorney, Agent, or Firm*—Oliff & Berridge

[57] ABSTRACT

A tape print device for printing bar codes on a print tape includes: an input unit for inputting data indicative of a bar code desired to be printed on a tape; a data storage unit for temporarily storing the inputted data; an increment unit for serially incrementing at least a part of the data stored in the data storage means at least one time, in accordance with a predetermined order, to thereby produce at least one incremented data indicative of at least one incremented bar code, the thus produced at least one incremented data being stored in the data storage means; a print data generating unit for producing print data for the desired bar code and the at least one incremented bar code, based on the data stored in the data storage means; and a printing unit for receiving the print data and for printing images of the desired bar code and the at least one incremented bar code on a print tape.

13 Claims, 28 Drawing Sheets

FIG. 34
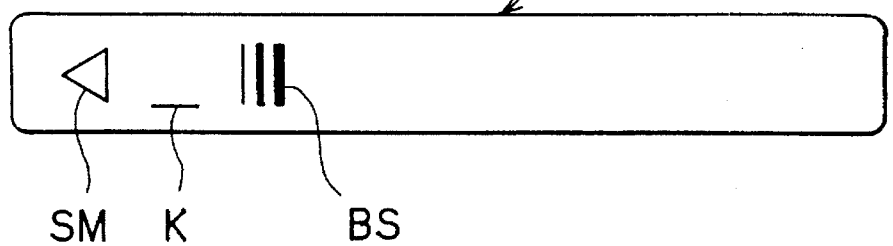
FIG. 35
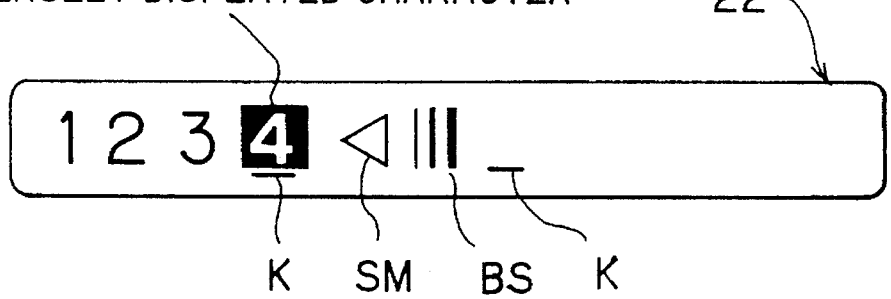
FIG. 36
TARGET NUMBER : ? ?

TAPE PRINTER

BACKGROUND OF THE INVENTION

1. Field of the Invention

The present invention relates to a tape printing device for printing desired bar codes on a tape.

2. Description of the Related Art

Japanese Patent Application Kokai No. HEI-5-177898 has proposed a tape printer including a keyboard, a display, and a print mechanism. The print mechanism is capable of printing characters, such as letters, symbols, and the like, on different width tapes (for example, 12 mm and 18 mm wide tapes) that are housed in cassettes. In particular, the tape mechanism is capable of printing bar codes on the tape with and in addition to the characters. The tape printer described in Japanese Patent Application Kokai No. HEI-5-177898 is well-suited printing file names on tapes that can be adhered to the back of files as identification labels.

Recently, another Japanese Patent Application Kokai No. HEI-5-185695 has proposed a tape printer for printing numbered character strings, made from inputted strings of numbers, on a tape while numbering processes are performed to increment numbering of successive character strings. This publication has proposed a structure also capable of performing numbering processes by incrementing or counting up at a line order of alphabetic characters.

With the popularization of office automation equipment, there is a general demand to computerize records of magnetic media, such as magnetic tapes and floppy disks, or of vast numbers of books in libraries. Keeping track of magnetic media or books can be easily performed by producing bar codes with category codes, that are for categorizing fields of magnetic media or books, and number codes associated with these categories, adhering the bar codes to the magnetic media or books, and reading the bar codes with a bar code reader.

The printer described in Japanese Patent Application Kokai No. HEI-5-177898 allows printing bar codes based on effective characters that are made from inputted numbers, characters, and the like. The printer described in Japanese Patent Application Kokai No. HEI-5-185695 allows performing numbering processes on numbered character strings (made from strings of numbers), but not on bar codes.

Therefore, to print a plurality of bar codes as labels, effective character strings, that are made from common character strings indicating categories and from number strings for sequentially numbering the categories, must be repeatedly inputted while sequentially incrementing the number strings. These processes complicated operations to print numbered bar code labels.

SUMMARY OF THE INVENTION

It is an objective of the present invention to provide a tape printer capable of numbering processes for sequentially incrementing countable character strings of bar codes so as to increase the all-purposeness of bar codes.

According to the present invention, a tape print device for printing bar codes on a print tape includes: input means for inputting data indicative of a bar code desired to be printed on a tape; data storage means for temporarily storing the inputted data; increment means for serially incrementing at least a part of the data stored in the data storage means at least one time, in accordance with a predetermined order, to thereby produce at least one incremented data indicative of at least one incremented bar code, the thus produced at least one incremented data being stored in the data storage means; print data generating means for producing print data for the desired bar code and the at least one incremented bar code, based on the data stored in the data storage means; and printing means for receiving the print data and for printing images of the desired bar code and the at least one incremented bar code on a print tape.

According to another aspect, the present invention provides a tape print device for printing bar codes on a print tape, the device comprising: input means for inputting data indicative of a bar code desired to be printed on a tape and various commands, the data indicative of the bar code including data of a common character string and a countable character string; data storage means for temporarily storing the inputted data indicative of the desired bar code; displaying means for receiving the data stored in the data storage means and for displaying the data; print data generating means for receiving the data from the data storage means and for producing dot image data for printing; printing means for receiving the dot image data and for printing a dot image on a print tape; incrementing means for incrementing the data of the countable character string every time when the printing means performs a printing operation for printing the dot image based on the data from the data storage means, the incrementing means updating the data of the countable character string stored in the storage means with the data of the incremented countable character string, the incrementing means repeatedly incrementing the countable character string of the data stored in the data storage means, while the print data generating means repeatedly generates dot image data for the data stored in the data storage means to cause the printing means to repeatedly print the data onto a tape, to thereby print the print tape with a plurality of bar codes, with their countable character strings being serially incremented.

According to a further aspect, the present invention provides a tape print device for printing bar codes on a print tape, the device comprising: input means for inputting data of a character string indicative of a bar code desired to be printed on a print tape and data of a normal character string desired to be printed on the print tape together with the bar code and various commands; bar code data conversion means for converting the data of the inputted character string into bar code data; display means for displaying the inputted reference character string and the bar code data converted by the bar code data conversion unit from the inputted character string; data storage means for storing the data of the inputted reference character string and the bar code data converted by the bar code data conversion unit from the inputted character string; print data conversion means for converting the data of the reference character string and the bar code data stored in the data storage unit into dot pattern data for printing; print data storage means for storing the dot pattern data; target number setting means for setting a target number up to which both the reference character string data and the bar code data are desired to be serially incremented; numbering part setting means for setting at least a part of each of the reference character string data and the bar code data desired to be serially incremented; bar cord incrementing means for serially incrementing the bar code data presently stored in the data storage unit and for replacing the bar code data with the incremented bar code data, in repetition from an initial number up to the target number of times set by the target number setting unit; reference character string incrementing means for serially incrementing at least a part of the data of the reference character string stored in the data storage means and for replacing the reference character string data with the incremented reference character string data, in repetition from the initial number up to the target number of times set by the target number setting unit; and printing means controlled by the dot pattern data stored in the print data storage unit to repeatedly print both the reference character string and the bar code symbols up to the set target number of times.

BRIEF DESCRIPTION OF THE DRAWINGS

The above and other objects, features and advantages of the invention will become more apparent from reading the following description of the preferred embodiment taken in connection with the accompanying drawings in which:

FIG. 34 illustrates how the bar code input screen is displayed;

FIG. 35 illustrates how the numbering part setting screen is displayed;

FIG. 36 illustrates how the target number setting screen is displayed; and

DETAILED DESCRIPTION OF THE PREFERRED EMBODIMENTS

Figure 1:
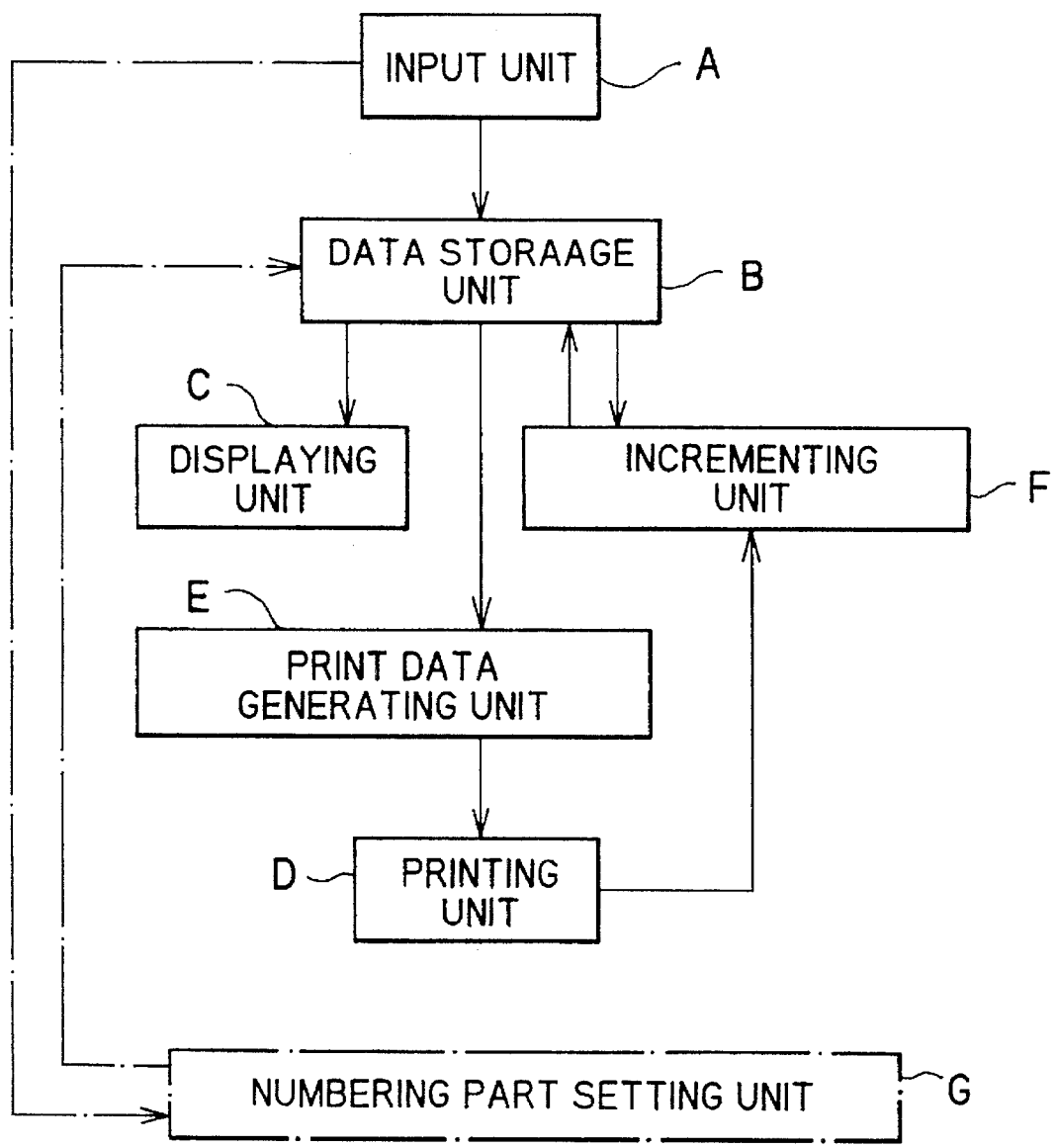
FIG. 1 is a block diagram showing a first embodiment according to the present invention.

A tape print device according to preferred embodiments of the present invention will be described while referring to the accompanying drawings wherein like parts and components are designated by the same reference numerals to avoid duplicating description.

A tape print device of a first preferred embodiment will be described with reference to FIGS. 1 through 24.

As shown in a block diagram of FIG. 1, the tape printer of the first embodiment includes: an input unit A; a data storage unit B; a displaying unit C; a printing unit D; a print data generating unit E; and an incrementing unit F. The input unit A is for inputting data of a character string made from a plurality of characters, such as letters, numbers and symbols, indicative of a bar code desired to be printed on a tape and various commands. The data storage unit B is for temporarily storing the inputted data of the character string indicative of the desired bar code. The displaying unit C is for receiving the data stored in the data storage unit B and for displaying the data. The printing unit D has a print head equipped with a plurality of printing elements for printing dot images. The print data generating unit E is for receiving the data from the data storage unit B, producing dot image data for printing, and outputting the dot image data to the printing unit D. The data of the character string indicative of the desired bar code is constructed from a common character string and a countable character string. Every time when the printing unit D performs a printing operation for printing the data from the data storage unit B, the incrementing unit F increments the countable character string. The incrementing unit F updates the data of the countable character string stored in the storage unit B with the data of the incremented countable character string. The incrementing unit F thus repeatedly increments the countable character string of the data stored in the storage unit B while not incrementing the common character string, based on which the print data generating unit E repeatedly generates dot image data to cause the printing unit D to repeatedly print the data onto a tape. As a result, the tape is printed with a plurality of bar codes, with their countable character string being serially incremented.

Thus, the plurality of bar codes, with their countable character strings being serially incremented, are printed on the tape, by merely inputting data of the first one of the plurality of bar codes.

As indicated by one-chain-and-one dot line in FIG. 1, the tape print device may further include a numbering part setting unit G. This numbering part setting unit G is for receiving a predetermined command for executing the numbering or incrementing process and for setting a part of the character string of the data stored in the data storage unit B, that are desired to be subjected to the numbering processes to be attained by the incrementing unit F. According to the embodiment, the setting unit G sets data indicative of start and stop positions of the part desired to be subjected to the numbering process, between which both the common character string and the countable character string of the character string for the bar code are entirely located. The setting unit G then stores the data for the start and stop positions in the data storage unit B. The incrementing unit F increments only the countable character string, even though the setting unit G thus sets the entire part of the character string to be subjected to the incrementing process.

The tape print device may preferably calculate a check digit data relating to the inputted data of the character string composed of the common character string and the countable character string. The incrementing unit F may preferably calculate the check digit data relating to the common character string and the incremented countable character string. The data storage unit B stores, as the updated bar code data, the data for the common character string and the incremented countable character string as well as the check digit data thus calculated for the incremented countable character string and the common character string.

A concrete example of this embodiment will be described below with reference to FIGS. 2 through 24.

This example is an application of the embodiment to a tape printer capable of printing, on a print tape, character strings or bar codes representative of character strings. It is noted that a character string is made from a series of a plurality of characters, such as alphabetic letters, numbers and symbols.

Figure 2:
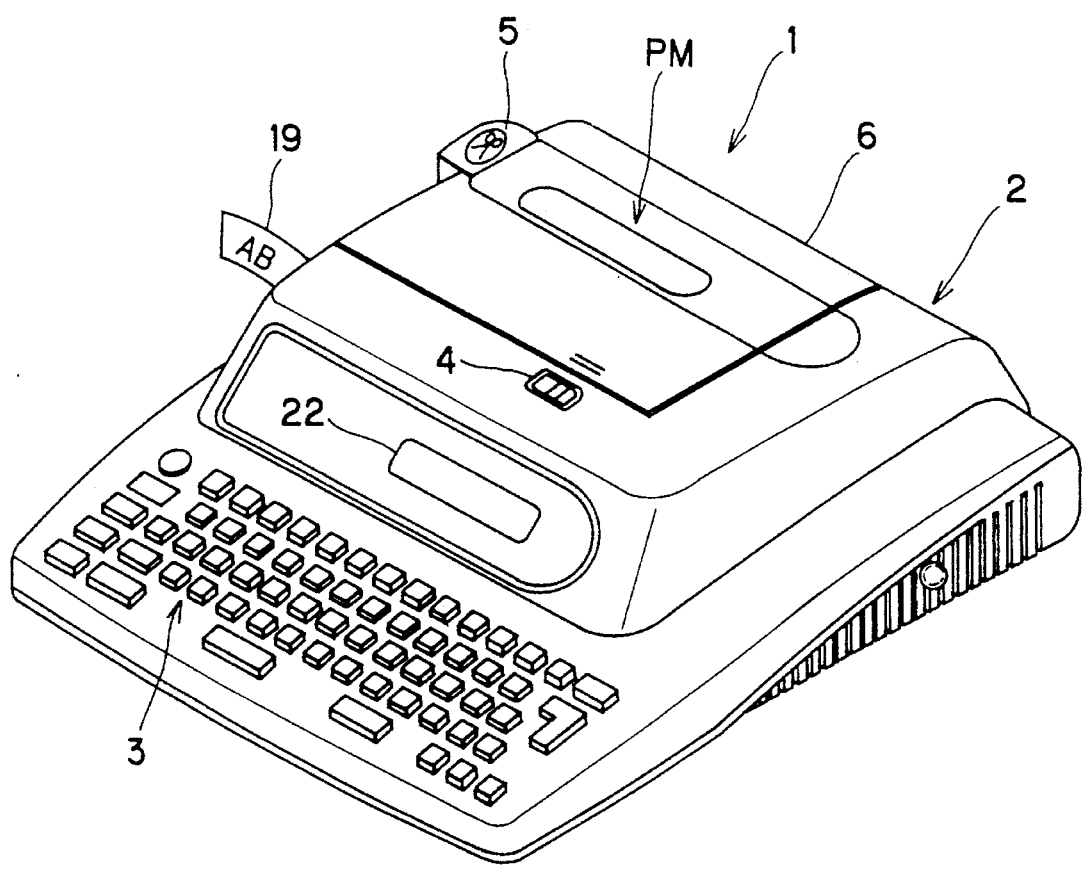
FIG. 2 is a perspective view of a tape printer of a concrete example of the first embodiment.

As shown in FIG. 2, a keyboard 3 is disposed in front of a body frame 2 of a tape printing apparatus 1, a printing mechanism PM is provided at the rear of the keyboard 3 and within the body frame 2, and a liquid crystal display 22, capable of displaying a character string or a simplified bar code symbol BS, is disposed just behind the keyboard 3. Reference numeral 4 denotes a release button for opening a cover frame 6 when a tape containing cassette CS, to be loaded in the printing mechanism PM, is put in or removed. Reference numeral 5 denotes a cut operating button for manually cutting a print tape 19.

On the keyboard 3, there are arranged such keys as character keys for inputting character code data of characters (i.e., alphabetic letters, numbers, and symbols,) a space key, a return key, cursor move keys (cursor move right key, cursor move left key, cursor move up key and cursor move down key) for moving a cursor K rightwardly, leftwardly, upwardly and downwardly, a size setting key for setting a desired size of characters to be printed, a bar code key for instructing input of bar code data, a numbering part setting key for setting a part of the inputted character string or the inputted bar code desired to be subjected to a numbering process, a bar code standard format setting key, a print key for commanding printing, an execution key for finalizing various types of setting, a cancel key for canceling the content which has been set, and a power key for turning power on/off.

Figure 3A:
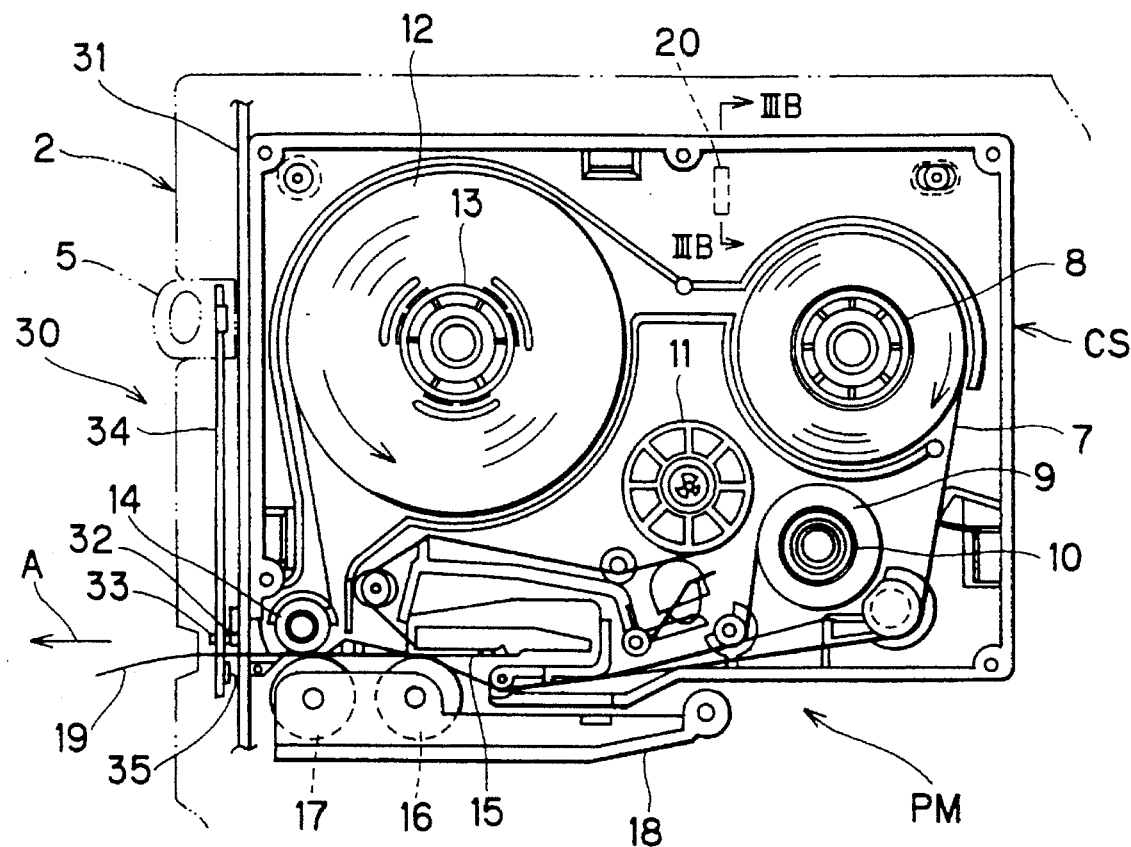
FIG. 3A is a schematic plan view of a print mechanism mounted with a tape cassette.

Referring to FIG. 3A, the printing mechanism PM will be described in detail. The rectangular, tape containing cassette CS is removably loaded in the printing mechanism PM. Within the tape containing cassette CS, there are rotatably provided a tape spool 8 around which a transparent laminate film 7 is wound, a ribbon supply spool 10 around which a print ribbon 9 is wound, a take-up spool 11 for taking up the print ribbon 9, a supply spool 13 around which a double coated tape 12 with the same width as the laminate film 7 is wound with its peeling paper on the outside, and a joining roller 14 for causing the double-coated tape 12 to adhere to the laminate film 7. The double-coated tape 12 is a tape having adhesive layers formed on both sides of its base tape and having peeling paper attached to the adhesive layer on one side.

A thermal head 15 (print head) is installed upright in the position where the laminate film 7 and the print ribbon 9 overlap each other. A platen roller 16 for pressing the laminate film 7 and the print ribbon 9 against the thermal head 15 and a feed roller 17 for pressing the laminate film 7 and the double coated tape 12 against the joining roller 14 to thereby form the print tape 19 are pivotally supported for rotation on a support member 18 which is pivotally mounted for rotation on the body frame 2. On the thermal head 15, there is provided a group of heating elements formed of a train of 128 heating elements arranged in the vertical direction.

Accordingly, when electric current is passed through the heating elements while the joining roller 14 and the take-up spool 11 are driven in their predetermined rotating directions in synchronism with each other by rotation of a tape feed motor 47 (refer to FIG. 4) in its predetermined rotating direction, characters and bar codes are printed on the laminate film 7 with plural trains of dots. Then, the double coated tape 12 is attached to the laminate film 7 and the tape is fed, as the print tape 19, in the tape feeding direction A to be discharged from the body frame 2 as shown in FIGS. 2 and 3A. Details of the printing mechanism PM are described in U.S. Pat. No. 5,188,469, the disclosure of which is hereby incorporated by reference.

Referring now to FIG. 3A, a manual cutting mechanism 30 for cutting the print tape 19 will be described in detail below. Just inside the body frame 2, there is provided a plate-formed auxiliary frame 31 in upright position and a stationary blade 32 is fixedly attached to the auxiliary frame 31 so as to face in an upward direction. An operating lever 34 extended in the direction from front to rear is supported for rotation, at its portion closer to the front end, on a pivot shaft 33 fixedly attached to the auxiliary frame 31. A movable blade 35 is fixedly attached to the operating lever 34 in front of the pivot shaft 33 such that it opposes the stationary blade 32. The rear end portion of the operating lever 34 is positioned under the cut operating button 5. Normally, the operating lever 34 is resiliently urged by a spring member, not shown, in the direction to separate the movable blade 35 from the stationary blade 32.

The print tape 19 having a character string or a bar code printed thereon passes through the space between the stationary blade 32 and the movable blade 35 and sticks out of the body frame 2. Then, if the cut operating button 5 is pressed down, the movable blade 35 is caused to approach the stationary blade 32 by the movement of the operating lever 34 and, then, the print tape 19 is cut by the blades 32 and 35.

As the print tape 19 to be fed from the tape containing cassette CS (i.e., the double-coated tape 12 and the laminate film 7 mounted in the cassette CS), there are provided those of five tape widths, 6 mm, 9 mm, 12 mm, 18 mm, and 24 mm. On the bottom wall of each tape containing cassette CS, there is provided a projecting piece 20. The projecting piece 20 formed on each tape cassette CS is for indicating a tape width of a tape 19 to be obtained from the tape cassette CS, i.e., the width of the double-coated tape 12 and the laminate film 7 mounted in the cassette CS. Because the width is either one of the five tape widths, the projecting piece 20 formed on each tape cassette CS is formed of three projecting claws, for distinguishing in combination one from the five tape widths.

Figure 3B:
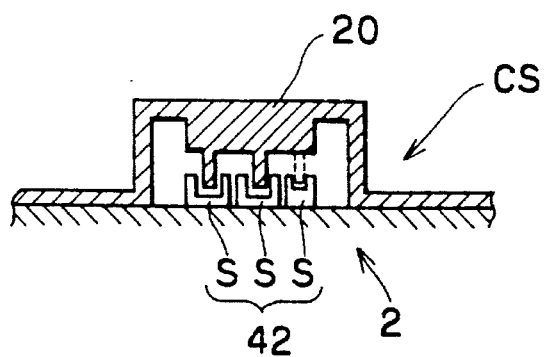
FIG. 3B is a schematic sectional view taken along a line IIIB—IIIB for showing a cassette sensor.

As shown in FIG. 3B, on the body frame 2, there is provided a cassette sensor 42 at a position confronting the projecting piece 20 when the tape cassette CS is loaded in the printing mechanism portion PM. The cassette sensor 42 is for detecting the condition of the projecting claws of the projecting piece 20 to thereby detect the tape width of a tape to be obtained from the tape cassette CS actually loaded in the printing mechanism portion PM. More specifically, the cassette sensor 42 is made from three photocouplers S, each having a light-emitting diode paired with a photodetector. Each of the three photocouplers is located at a position capable of receiving a corresponding one of the three projecting claws of the projecting piece 20. Each photosensor therefore detects whether or not the corresponding projecting claw is inserted between the light-emitting diode and the photodetector.

Figure 4:
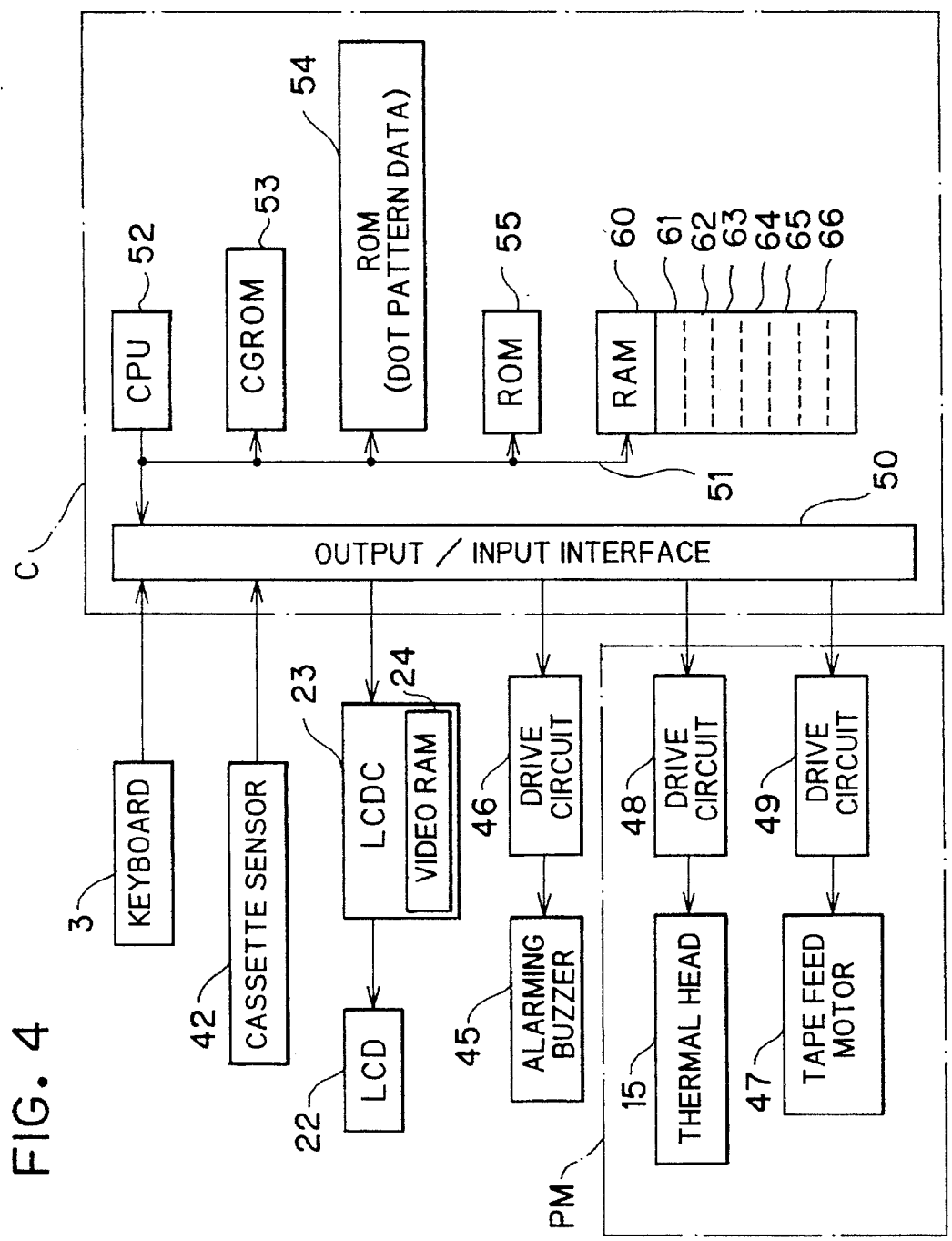
FIG. 4 is a block diagram of a control system of the tape printer.

The control system of the tape printing apparatus 1 is structured as shown in the block diagram of FIG. 4.

An input/output interface 50 of a controller C is connected with the keyboard 3, the cassette switch 42, a display controller (LCDC) 23 having a video RAM 24 for outputting display data to the liquid crystal display (LCD) 22, a drive circuit 46 for an alarming buzzer 45, a drive circuit 48 for driving the thermal head 15, and a drive circuit 49 for driving the tape feed motor 47.

The controller C includes a CPU 52 and the input/output interface 50, a CGROM 53, ROMs 54 and 55, and a RAM 60 connected to the CPU 52 with a bus 51 such as a data bus.

The CGROM 53 stores dot pattern data for displaying each of a plurality of characters, such as alphabetic letters, numbers and symbols, correspondently to a plurality of code data inputtable through operation of the character keys, on the key board 3.

The ROM (dot pattern data memory) 54 stores dot pattern data for printing a plurality of characters, such as alphabetic letters, numbers and symbols, correspondently to the plurality of code data inputtable through operation of the character keys on the key board 3. The dot pattern data of each character is stored for each of a plurality of typefaces (such as Gothic type and Ming-cho type), at each of seven print character sizes (16, 24, 32, 48, 64, 96, and 128 dot sizes). The ROM 54 further stores dot pattern data for printing a plurality of bar code modular data.

The ROM 55 stores various programs including a display drive control program for controlling the display controller 23 according to character code data, which represent characters, such as letters, numbers, symbols and the like, that are inputted through the keyboard 3; a print drive control program for serially retrieving data from a print data buffer 66 and driving the tape feed motor 47, the thermal head 15, and the like; and a tape print control program (to be described later), which is special characteristic of the present invention. The tape print control program includes a subroutine for controlling bar code data conversion processes for converting the bar code data (character code data of an effective character string stored in the text memory 61) into bar code modular data, based on a desired bar code standard format, such as code standard formats of CODE-39 and EAN-12 (Europe Article Number-13).

The RAM 60 is formed with a text memory 61, a pointer buffer 62, a bar code buffer 63, a bar code parameter memory 64, a count memory 65, and the print data buffer 66. The bar code buffer 63 is for preparing bar code data made from character code data of an effective character string representative of a desired bar code. The effective character string is made from: a character string which is inputted from the key board 3 and which is made from a plurality of characters, such as letters, numbers, symbols; and other characters prepared for producing the desired bar code. For example, according to a bar code standard format of "CODE 39", a character string inputted from the key board; and a start code (*), a stop code (*), and a check digit data if needed serve as the effective character string. The text memory 61 is for temporarily storing text data. The text data is made from character code data of a normal character string inputted from the keyboard 3 or the bar code data prepared in the bar code buffer 33. A pointer value TP for indicating an address in the text memory 61 is stored in the pointer buffer 62. The bar code parameter memory 64 is for storing data indicating: name of a bar code standard format by which a bar code is desired to be produced; an effective digit number of an effective character string convertable into a desired bar code modular data according to the desired bar code standard format, necessity or unnecessity of calculating a check digit for the inputted characters for the desired bar code according to the desired bar code standard format. The count memory 65 is for storing data (count number I) indicating the number of times numbering processes are desired to be repeatedly performed. The print data buffer 66 is for temporarily storing print dot pattern data for the desired bar code or the desired normal character string for printing. The print dot pattern data for the normal character string is produced based on the character code data of the inputted characters stored in the text memory 61 and the dot pattern data stored in the ROM 54. The print dot pattern data for the bar code is produced based on the dot pattern data stored in the ROM 54 and bar code modular data which are produced based on the character code data (bar code data) of the effective character string stored in the text memory 61 through the subroutine for the bar code data conversion process.

An explanation of the routine for tape print control performed by the control device C of the tape print device 1 will be provided based on the flowcharts shown in FIGS. 5 through 11. In the figures, symbols Si (wherein i=10, 11, 12, . . . ) refer to separate steps.

This control starts when the power source is turned on by manipulating the power source key on the keyboard 3. First, in S10, the memories 61 through 66 in the RAM 60 are cleared, an initial setting process for initializing the print mechanism PM is executed, and a text data inputting screen is displayed on the display 22 for inputting text data (character code data of a normal character string) desired to be printed on a tape.

Figure 12:
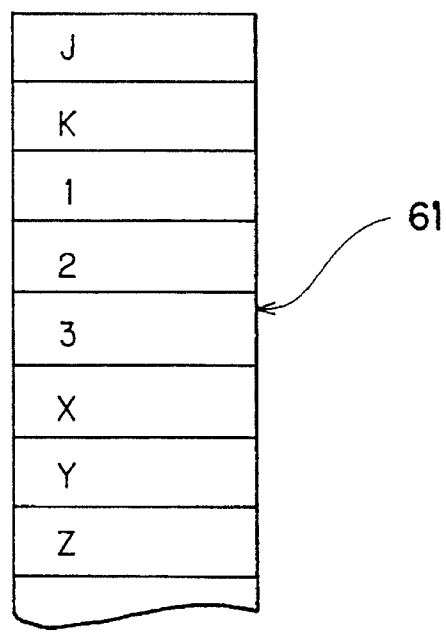
FIG. 12 illustrates data arrangement in a text memory stored with a character string.
Figure 17:
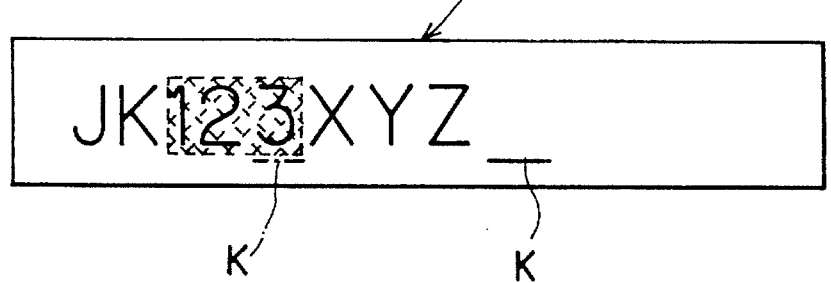
FIG. 17 illustrates how the inputted character string is displayed.

When keys representing printable characters, such as alphabetic letters, numbers and symbols, are operated (i.e., S11 and S12 are YES), then text data input and display process is executed (S16) and the program returns to S11. In the text data input and display process, character code data, that represents the manipulated key of the printable character, is stored in the text memory 61 of the RAM 60 as text data. The character corresponding to the character code data stored in the text memory 61 is also displayed on the display 22. For example, when the character string "J K 1 2 3 X Y Z" is inputted, the characters constituting the character string are serially stored in the text memory 61 as shown in FIG. 12, and the character string "J K 1 2 3 X Y Z" is displayed on the display 22 as shown in FIG. 17. It should be noted that the symbol K in FIG. 17 represents the cursor.

On the other hand, when the bar code key for inputting and preparing bar code data is manipulated (i.e., S11 is YES, S12 is NO, and S13 is YES), control processes for inputting and preparing bar code data (refer to FIG. 6) are executed (S17).

Figure 6:
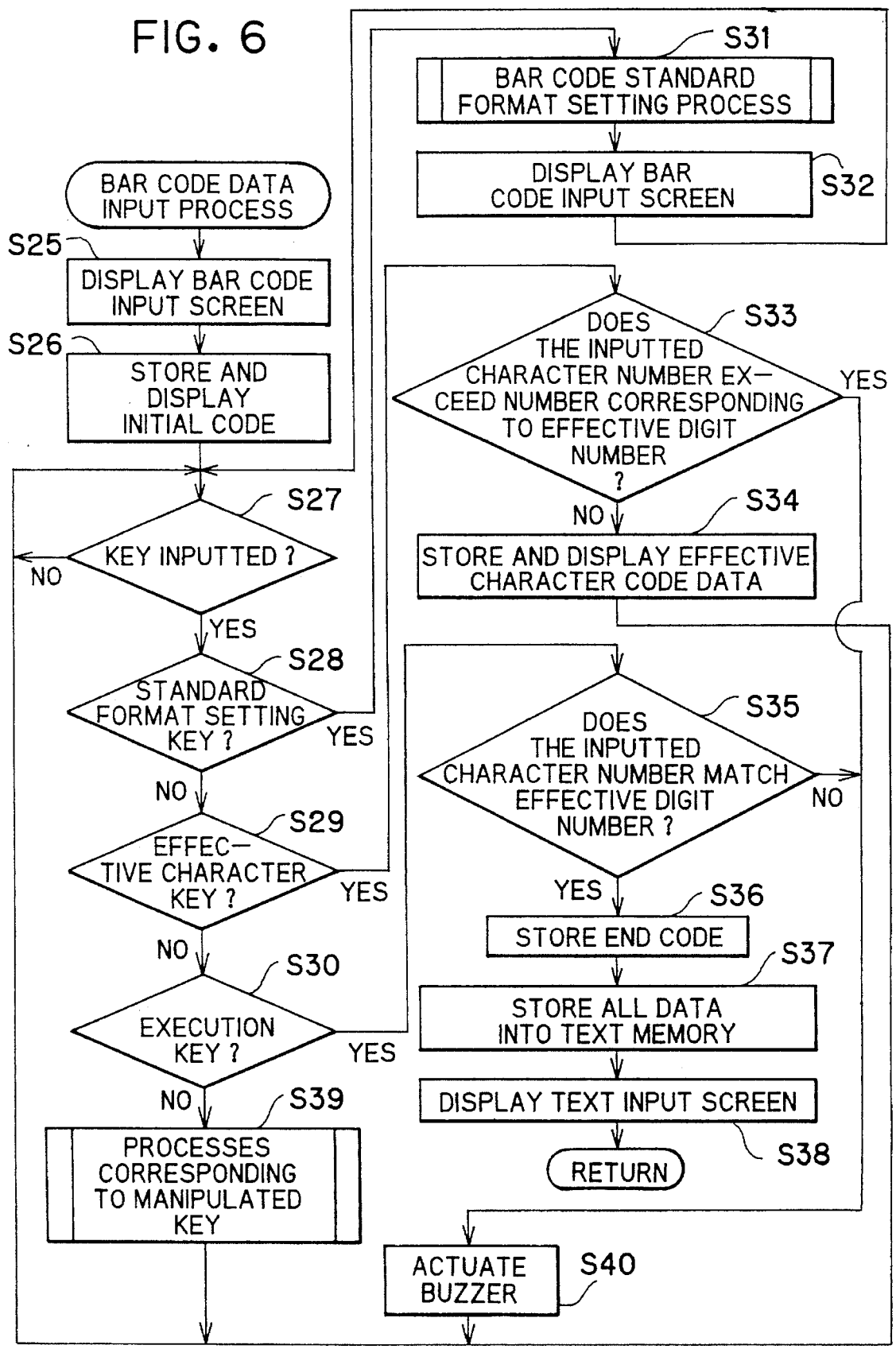
FIG. 6 schematically shows a flow chart of bar code data input process control routine.
Figure 13:
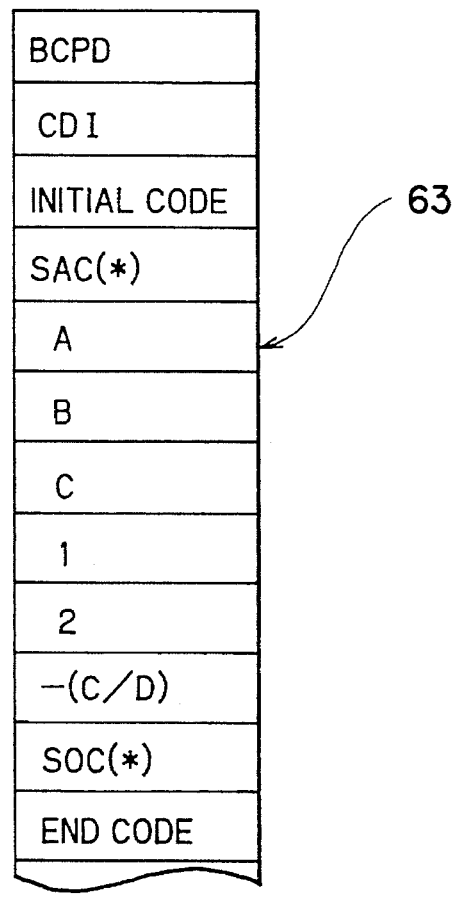
FIG. 13 illustrates data arrangement in a bar code buffer.
Figure 19:
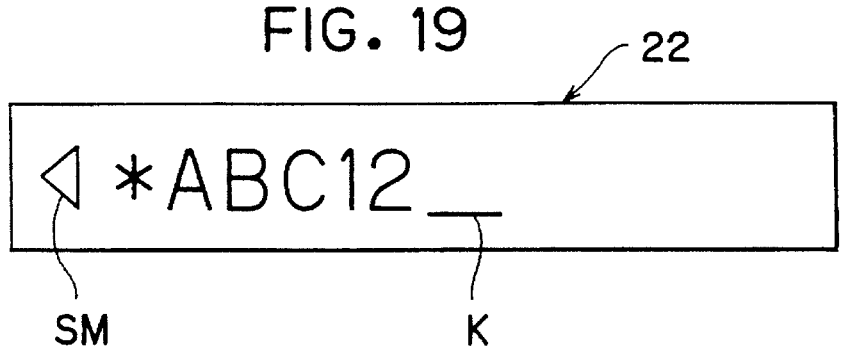
FIG. 19 illustrates how the inputted bar code data is displayed.

As shown in FIG. 6, when this control process starts, a bar code input screen is first displayed on the display 22 (S25) for inputting a bar code. An initial code for the bar code is first stored in the bar code buffer 63, and the initial mark SM is displayed (S26). For example, the initial code is stored in the third storage address of the bar code buffer 63 as shown in FIG. 13, and a triangular initial mark SM is displayed at the left lead position of the bar code input screen as shown in FIG. 19. It is noted that bar code parameter data BCPD, including data on effective digit number, check digit, and name of bar code standard format with which the bar code data is desired to be produced, will be stored in the lead storage address of the bar code buffer 63. Check digit information data CDI for checking the necessity or unnecessity of calculating check digit data will be stored in the second storage address of the bar code buffer 63, as will be described below.

When the key for setting the bar code standard format is manipulated (i.e., S27, and S28 are YES), a process control for setting a desired bar code standard format (refer to FIG. 7) is executed (S31).

Figure 7:
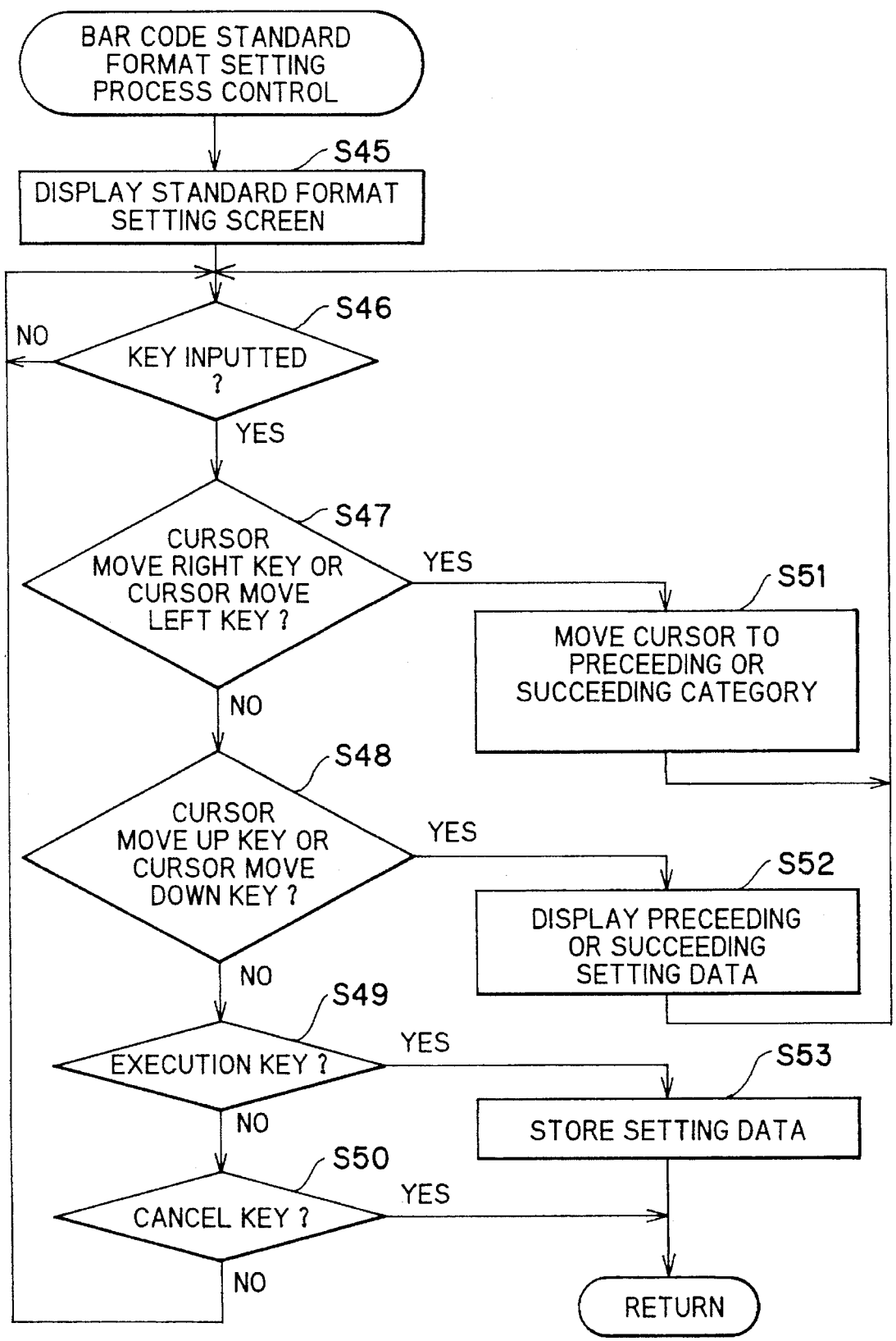
FIG. 7 schematically shows a flow chart of bar code standard format setting process control routine.
Figure 20:
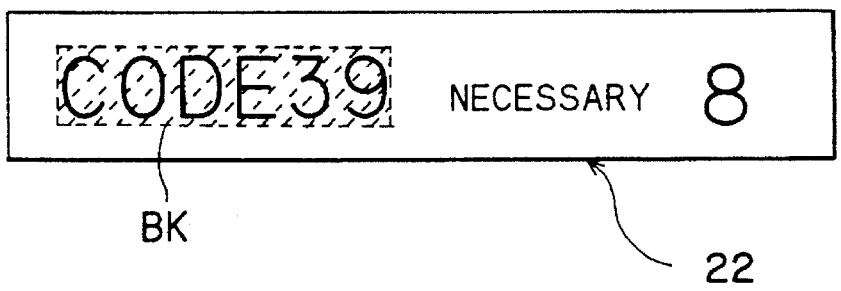
FIG. 20 illustrates a bar code standard format setting screen.

As shown in FIG. 7, when this control is started, first, a screen for setting the standard format of the bar code is displayed on the display 22 (S45). For example, as shown in FIG. 20, a frame is formed in the display 22, and titles such as "Standard Format Name", "C/D" (check digit), and "Effective Digit Number" are displayed directly above the frame. In the frame, a default standard format ("CODE 39", for example) is displayed at the position labeled "Standard Format Name". Also, a default data ("Necessity", for example) is displayed for "C/D", and a default data ("2", for example) is displayed for "Effective Digit Number".

In the frame, a block cursor BK is provided for setting each one of the "Standard Format Name", "C/D" (check digit), and "Effective Digit Number". FIG. 20 shows the case where a block cursor BK is located for setting the standard format name. In the block cursor BK, the default standard format "CODE 39" is reversely displayed. More specifically, colors at which characters and background are displayed in the block cursor BK are reversed to those at which characters and background are displayed normally outside of the block cursor BK. When the cursor move right key or the cursor move left key is manipulated (i.e., S46 and S47 are YES), the block cursor BK moves to the preceding or succeeding category, the results are displayed (S51), and the program returns to S46. For example, when the block cursor BK is positioned at the "Standard Format Name" to reversely display the setting data "CODE 39" as shown in FIG. 20, the block cursor BK will proceed to the position of "C/D" (check digit) to reversely display "Necessity" when the cursor move right key is manipulated and further to the position of "Effective Digit Number" to reversely display "2" if the cursor move right key is manipulated again.

When the cursor move up key or the cursor move down key is manipulated (i.e., S46 is YES, S47 is NO, and S48 is YES), the setting data preceding or succeeding the setting data presently displayed within the block cursor BK is displayed (S52) and the program returns to S46. For example, when the block cursor BK is positioned to display the setting data "CODE 39" therein, the displayed content will change to "EAN-13" when the cursor move up key is manipulated and back to "CODE 39" if the cursor move up key is manipulated again. When setting data "Necessity" is being displayed within the block cursor BK, the displayed content will change to "Unnecessity" when the cursor move up key is manipulated and back to "Necessity" if the cursor move up key is manipulated again. When setting data "2" is being displayed within the block cursor BK, the displayed content will change to "3" when the cursor move up key is manipulated, and "4" if the cursor move up key is manipulated again, and so on.

On the other hand, when the execution key is manipulated (i.e., S46 is YES, S47 and S48 are NO, and S49 is YES), the three displayed setting data are stored in respective predetermined storage regions of the bar code parameter memory 64 of the RAM 60 and, based on these setting data, bar code parameter data BCPD and check digit information data CDI are stored in the bar code buffer 63 (S53). Then, this control is ended and the program returns to S32 of the bar code data input process control of FIG. 6. For example, manipulating the execution key when the "CODE 39", "Necessity", and "8" are displayed as shown in FIG. 20 these three setting data are stored separately in the bar code parameter memory 64. It is noted that when the setting data of the bar code standard format name of "CODE 39" is set, the start code * (SAC) is stored in the bar code buffer 63 at an address following the address at which the initial code is stored.

Then, in the bar code data input process control of FIG. 6, the bar code input screen is displayed on the display 22 (S32), whereupon the program returns to S27. For example, when the standard of "CODE 39" is set, as shown in FIG. 19, the start mark "*" is displayed on the display 22 after the initial mark SM. However, when the cancel key is manipulated during the bar code standard setting process control of FIG. 7 (i.e., S46 is YES, S47 through S49 are NO, and S50 is YES), this control is ended without setting data and the program returns to S27, via S32 of the bar code data input process control.

When an effective character key, such as an alphabetic letter key or a number key, is depressed during the bar code data input process control of FIG. 6 (i.e., S27 is YES, S28 is NO, and S29 is YES), it is judged in S33 whether the number of characters which have been inputted from the key board 3 exceeds the number corresponding to the effective digit number data now stored in the bar code parameter memory 64. If the number of the inputted characters (i.e., the digit number of the inputted character string) is determined not to be excessive (i.e., S33 is NO), the inputted effective character code data are stored in the bar code buffer 63 (S34) and the program returns to S27. Now assume that the bar code standard format "CODE 39" is selected, the check digit data is set to be necessarily calculated, and the effective digit number of "8" is set. In this case, the start code (*), the stop code (*), the check digit code, and a character string, constructed from five (5) characters inputted from the key board 3, make up an effective character string of the eight (8) effective digit number. Accordingly, the step S33 judges whether the number of the characters inputted from the key board 3 exceeds the number "5" corresponding to the effective digit number "8". When a character string "A B C 1 2" is inputted from the key board 3, for example, the character code data for the character string "A B C 1 2" are therefore stored in the bar code buffer 63 at addresses following the start code * (SAC) as shown in FIG. 13, and the character string "A B C 1 2" is displayed after the start mark "*" as shown in FIG. 19. On the other hand, when the digit number of the inputted character string is too high (i.e., S33 is YES) and exceeds the number corresponding to the effective digit number, a warning buzzer 45 will sound off (S40) and the program will return to S27.

When the execution key is manipulated (i.e., S27 is YES, S28 and S29 are NO, and S30 is YES), if the digit number of the inputted character string matches the number corresponding to the set effective digit number (i.e., S35 is YES), the bar code end code is stored in the bar code buffer 63 (S36). It is noted that in the case where the check digit has been set to "Necessity", the value of the check digit is calculated for the inputted characters in S36. The calculated value of the check digit, the stop code * (SOC), and the end code are stored separately in the bar code buffer 63. Thus, bar code data for the desired bar code are prepared in the bar code buffer 63. All the bar code data thus prepared in the bar code buffer 63 are then stored as text data into the text memory 61 (S37), and the text input screen is displayed (S38). As a result, this control is ended and returns to S11 of the tape print control of FIG. 5.

Figure 14:
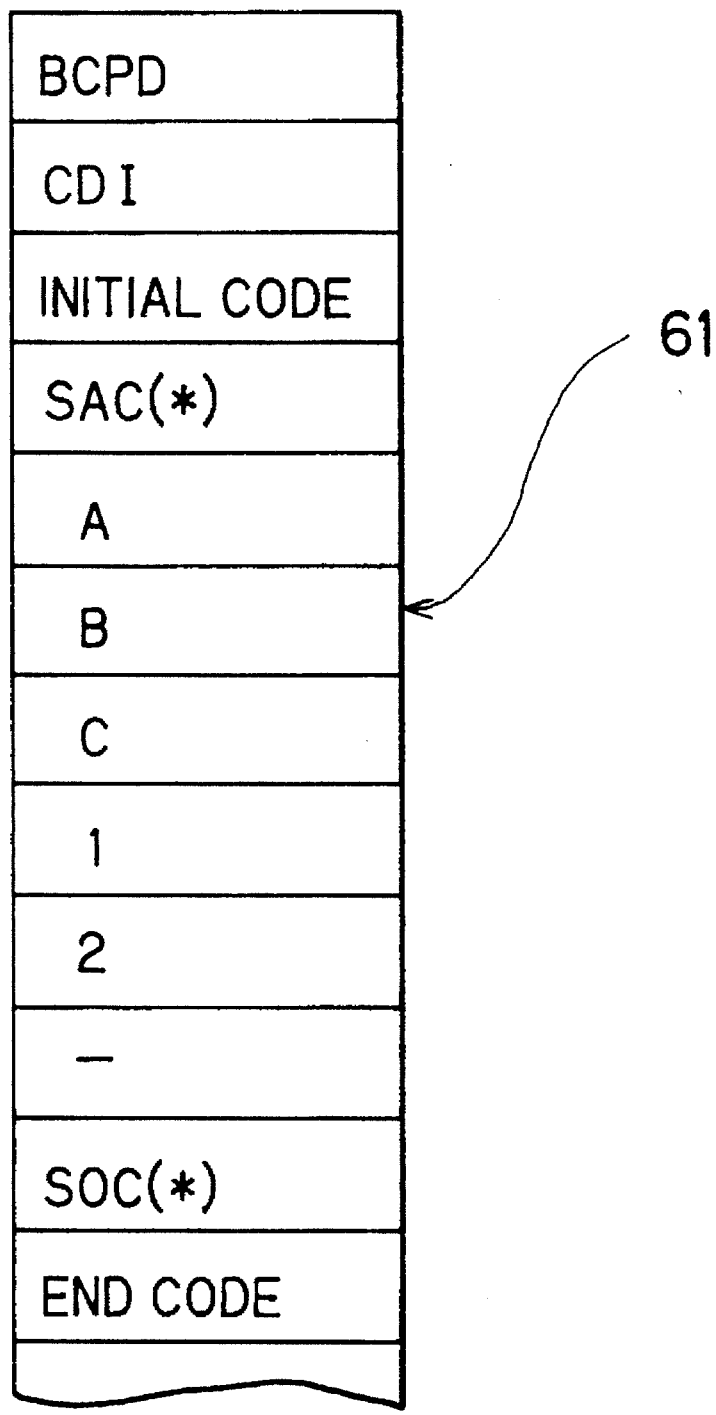
FIG. 14 illustrates data arrangement in a text memory stored with a character string of a bar code data.
Figure 21:
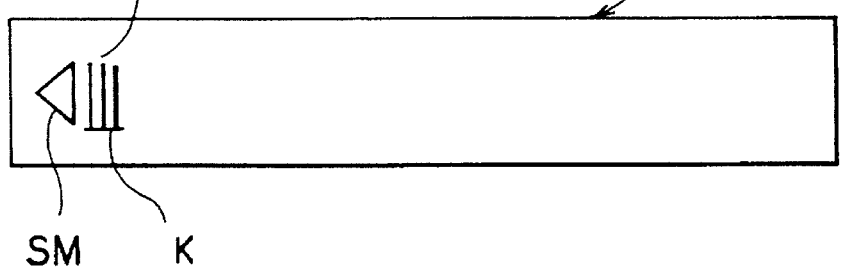
FIG. 21 illustrates how a bar code mark is displayed.

For example, when the "CODE 39" "Necessity" and "8" have been set, the calculated check digit value (C/D) of [(hyphen)], the stop code * (SOC), and the end code are added to the character string "A B C 1 2", and are stored in the bar code buffer 63 as shown in FIG. 13. All the bar code data are then stored in the text memory 61 as text data as shown in FIG. 14. The simplified bar code symbol BK is displayed on the display 22 together with an initial mark SM and an end mark EM corresponding to the end code, as shown in FIG. 21.

On the other hand, if the digit number of the inputted character string does not match the number corresponding to the effective digit number (i.e., S35 is NO), the warning buzzer 45 sounds off (S40) and the program returns to S27.

Further, when keys other than the execution key, the effective character key, or the standard setting key is manipulated (i.e., S27 is YES and S28 through S30 are NO), process corresponding to the manipulated key is executed (S39) and the program returns to S27.

Figure 5:
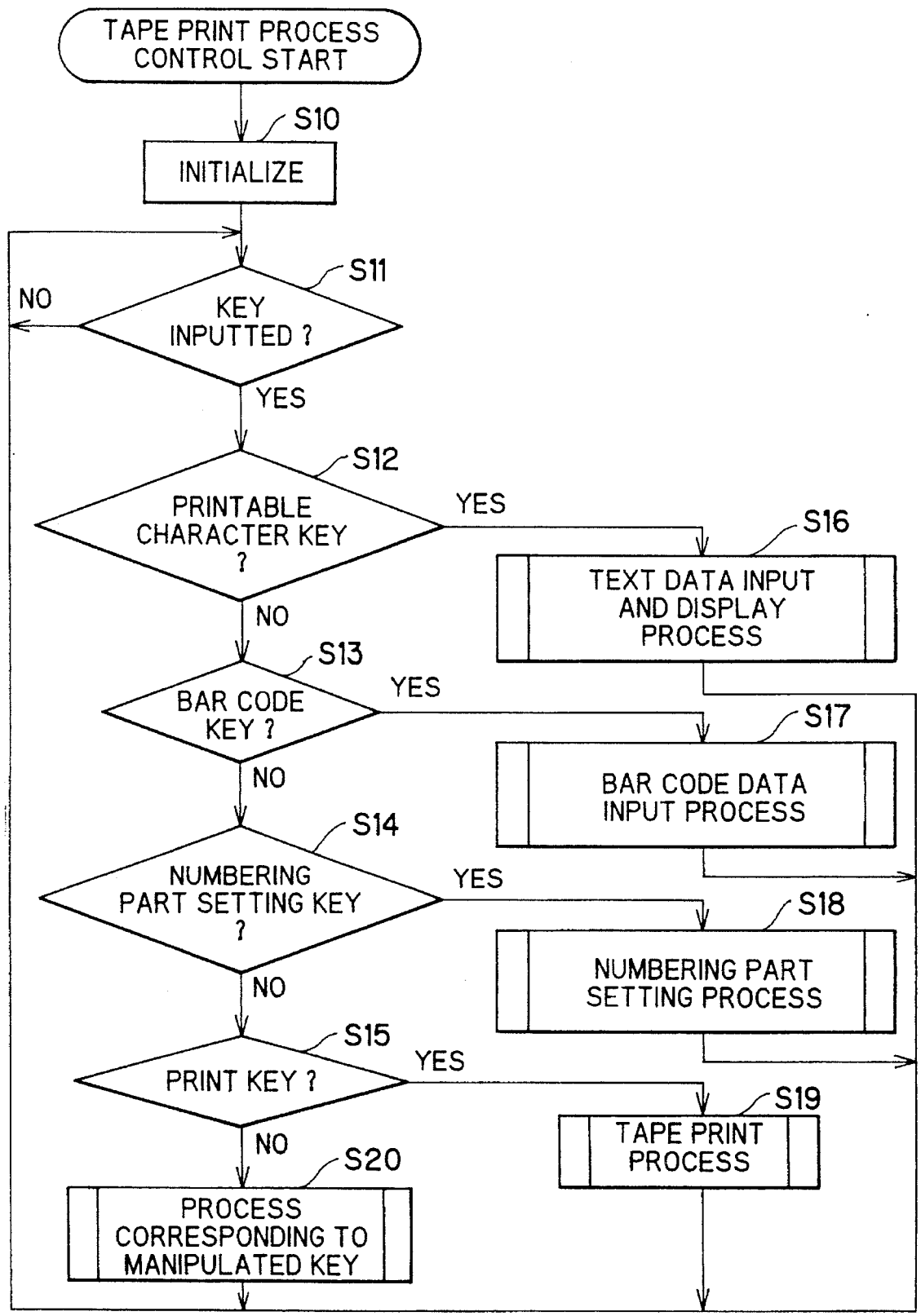
FIG. 5 schematically shows a flow chart of tape print process control routine.

Afterwardly, when the numbering part setting key is manipulated during the tape print control of FIG. 5 (i.e., S11 is YES, S12 and S13 are NO, and S14 is YES), a process control for setting a part of the inputted character string that is desired to be subjected to a numbering process (refer to FIG. 8) is executed (S18).

Figure 8:
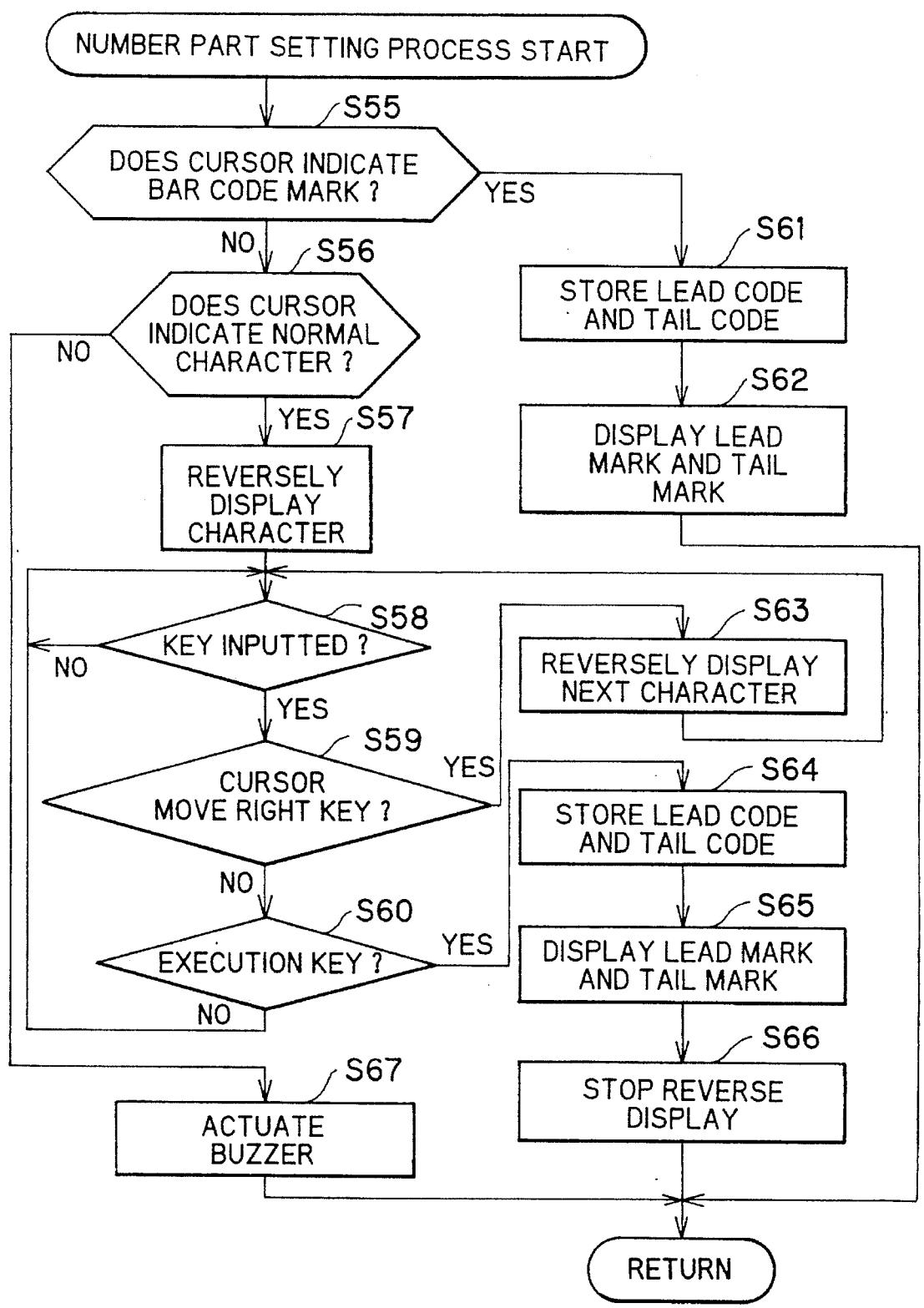
FIG. 8 schematically shows a flow chart of numbering part setting process control routine.

As shown in FIG. 8, when this control is started, if the cursor K is positioned at a normal character, not the character for the bar code (i.e., S55 is NO and S56 is YES), the character is reversely displayed (S57).

Figure 15:
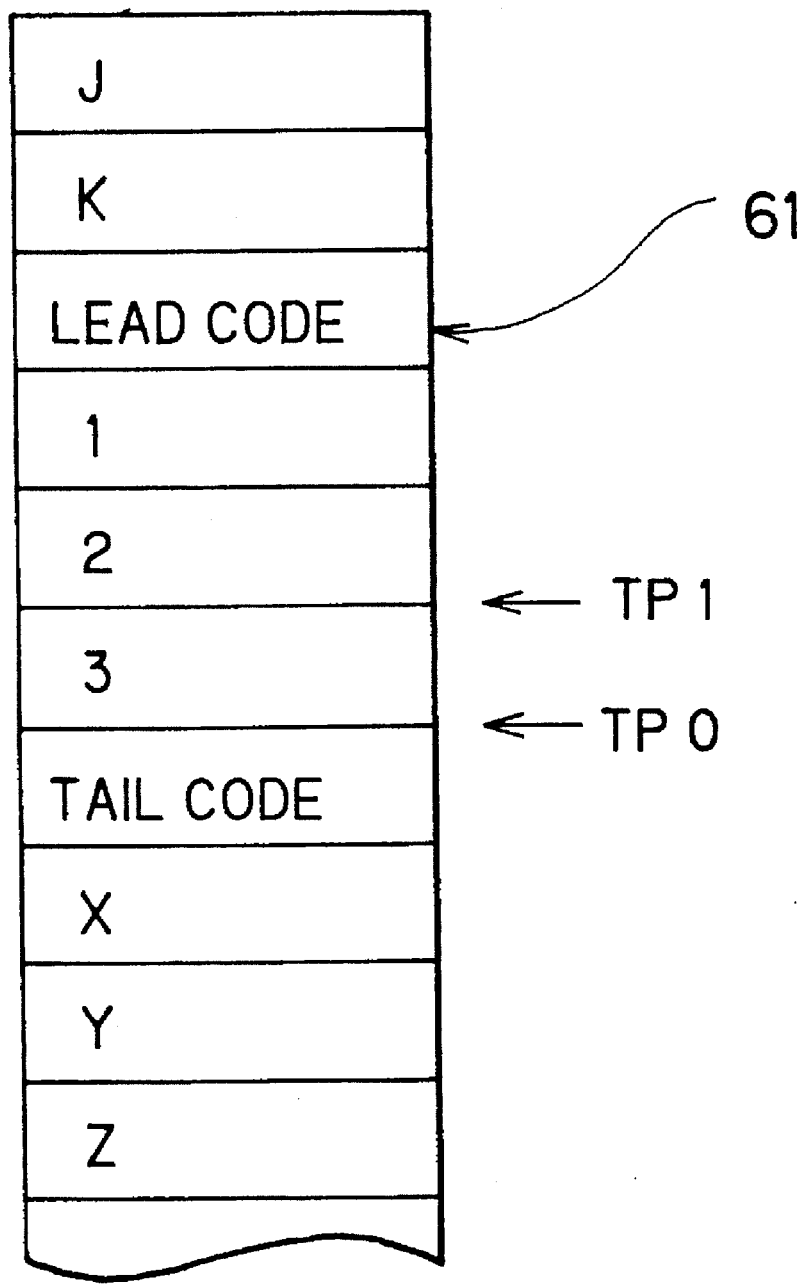
FIG. 15 illustrates data arrangement in a text memory stored with a character string to be subjected to a numbering process.
Figure 18:
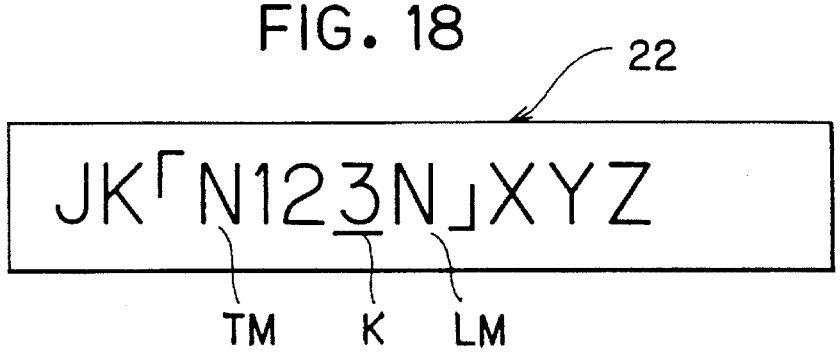
FIG. 18 illustrates how the inputted character string is displayed with marks for the numbering process.

When the cursor move right key is manipulated (i.e., S58 and S59 are YES), the next character is also reversely displayed in the same way (S63) and the program returns to S58. When the execution key is manipulated (i.e., S58 is YES, S59 is NO, and S60 is YES), a lead code and a tail code that respectively indicate a leading end and a trailing end of the part of the character string desired to be subjected to the numbering process are stored in the text memory 61 at positions before and after the reversely displayed part of the character string (S64). Then, a lead mark that corresponds to the lead code and a tail mark that corresponds to the tail code are displayed inserted before and after the part of the character string desired to be subjected to the numbering process (S65). Next, reverse display is stopped (S66), whereupon this control is ended and the program returns to S11 of FIG. 5. For example, as shown in FIGS. 12 and 17, assume now that the inputted character string "J K 1 2 3 X Y Z" is displayed and that the cursor K indicates number "1" at the start of this control. Of the character code data of the entire character string "J K 1 2 3 X Y Z", the parts "J K" and "X Y Z" (letter strings) are common character strings desired to be printed common with each numbered bar code. The letter strings "J K" and "X Y Z" should not be incremented in the numbering process. Contrarily, the part "1 2 3" (number string) is a countable character string desired to be incremented through the numbering process. For example, when the part "1 2 3" of the character string "J K 1 2 3 X Y Z" is desired to be subjected to the numbering process, the cursor right move key is operated to move the cursor K to number "3" after when the numbering part setting key is manipulated. Manipulating the execution key thereafter causes the number string "1 2 3" to be reversely displayed. The lead code and the tail code are therefore stored in the text memory 61 inserted respectively before and after the number string to be subjected to numbering, that is, "1 2 3", as shown in FIG. 15. The lead mark TM and the tail mark LM are displayed inserted respectively before and after the character string "1 2 3" to be subjected to numbering as shown in FIG. 18.

On the other hand, at the start of this control, if the cursor K indicates a bar code mark (i.e., S55 is YES), that is, if the cursor K indicates either the initial mark SM or the end mark EM of the bar code data, the data stored in the text memory 61 are searched, and the lead code is stored inserted directly before the initial code of the bar code and the tail code is stored inserted directly after the end code (S61). On the display 22, the lead mark TM is displayed inserted directly before the initial mark SM and the tail code is displayed inserted directly after the end mark EM (S62). This control is then ended and the program returns to S11 of FIG. 5.

Figure 16:
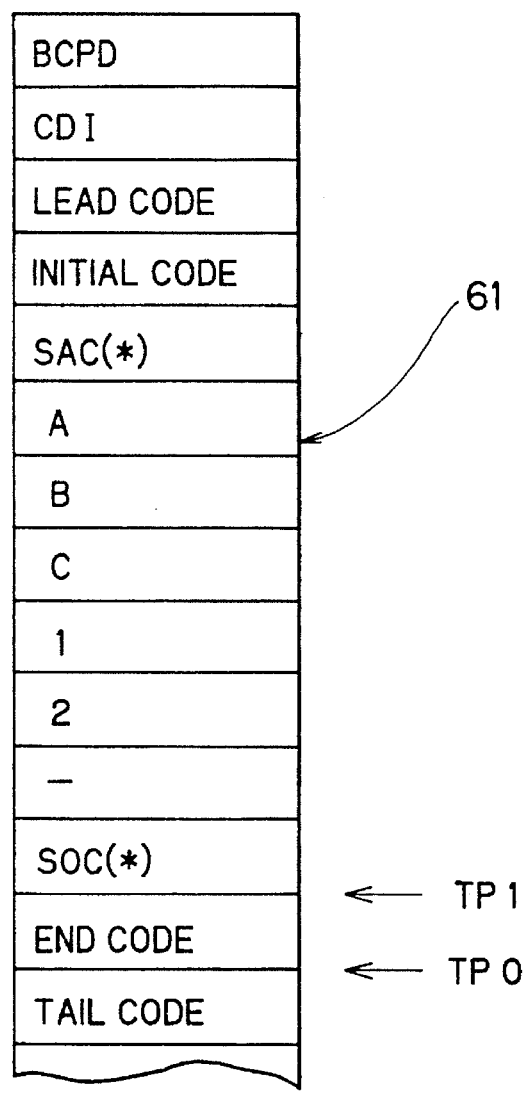
FIG. 16 illustrates data arrangement in a text memory stored with a character string of bar code to be subjected to a numbering process.
Figure 22:
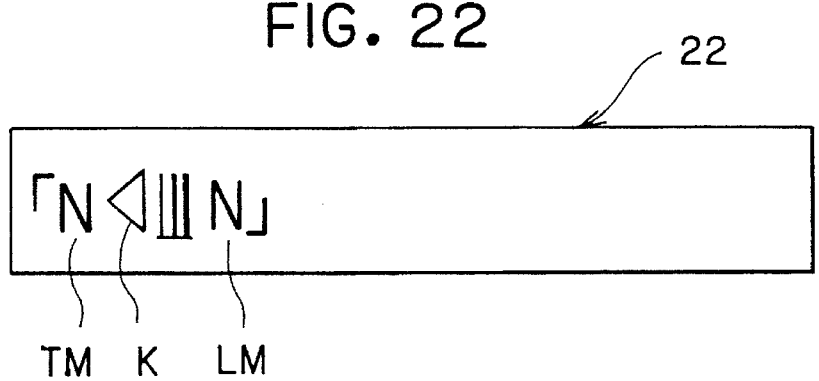
FIG. 22 illustrates how the inputted bar code data is displayed with marks for the numbering process.

For example, as shown in FIGS. 13 and 21, assume now that the initial mark SM and the end mark EM of the bar code are displayed and that the cursor K is positioned at the end mark EM at the start of this control. Manipulating the numbering setting key therefore stores the lead code directly before the initial code and the tail code directly after the end code as shown in FIG. 16. Also, the lead mark TM and the tail mark LM are displayed inserted respectively before and after the bar code mark as shown in FIG. 22. Thus, according to the present invention, when numbering processes are desired to be performed on bar code data, this numbering setting key allows collective setting of the character string to undergo numbering. More specifically, of the bar code data of the entire character string "A B C 1 2", the part "A B C" (letter string) is a common character string desired to be printed common with each numbered bar code. The letter string "A B C" should not be incremented in the numbering process. Contrarily, the part "1 2" (number string) is a countable character string desired to be incremented through the numbering process. According to the present invention, however, the entire character string "A B C 1 2" is collectively set to subjected to the numbering process.

On the other hand, at the start of this control, if the cursor K is positioned somewhere other than the location of a bar code mark or a normal character (i.e., S55 and S56 are NO), because the character string to be subjected to numbering can not be set, the warning buzzer 45 sounds off (S67), control is ended, and the program returns to S11 of FIG. 5.

Afterwardly, when the print key is manipulated during the tape print control of FIG. 5 (i.e., S11 is YES, S12 through S14 are NO, and S15 is YES), print process control (refer to FIG. 9) is executed (S19).

Figure 9:
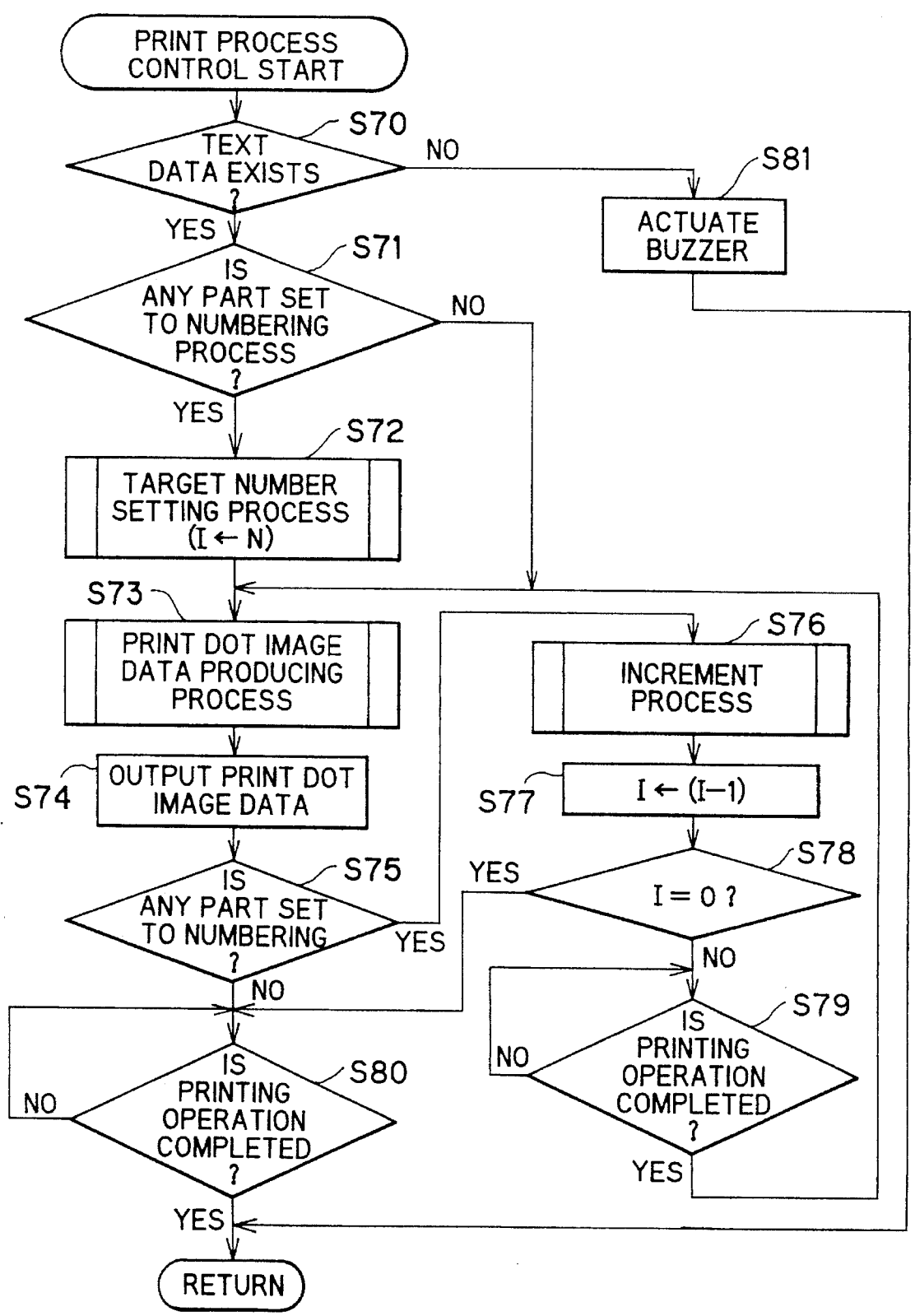
FIG. 9 schematically shows a flow chart of print process control routine.

As shown in FIG. 9, when some text data (normal character string code data or bar code data) exists in the text memory at the start of this control (i.e., S70 is YES), if the text data includes no tail or lead code, that is, if no part of the text is desired to be subjected to the numbering processes (i.e., S71 is NO), print dot image data is produced based on the entire text data. More specifically, if the text data is the normal character string code data, the print dot image data is produced based on the character code data and the dot pattern data stored in the ROM 54. If the text data is the bar code data, bar code modular data is first produced based on the character code data constituting the bar code data and the bar code data conversion program (subroutine). Then, the print dot image data is produced based on the bar code modular data and the dot pattern data stored in the ROM 54. Thus obtained print dot image data is stored in the print data buffer 66 (S73). The print dot image data is then outputted from the print data buffer 66 to the print mechanism PM (S74) for printing. More specifically, the print drive control is achieved for serially retrieving the data from the print data buffer, and the motor 47 and the thermal head 15 are driven to perform the printing operation.

When numbering processes are not executed for the text data (i.e., S75 is NO), the program enters a waiting period until the print mechanism PM ends printing operations for printing the print dot image data onto the print tape 19 (i.e., S80 is YES). Then, this control ends, and the program returns to S11 of FIG. 5.

On the other hand, when no text data is present in the text memory 61 at start of this control (i.e., S70 is NO), the warning buzzer 45 sounds off (S81). Then, this control is ended, and the program returns to S11 in the same way.

When some part of the text data in the text memory 61 is to undergo the numbering processes (i.e., S70 and S71 are YES), a process control for setting a target number up to which the numbering processes are desired to be repeatedly performed is executed (S72). In this process control, a set screen is displayed on the display 22 for setting the numbering process target number. When the execution key is manipulated after the desired target number is inputted by manipulating the number keys, the data of the set target number is stored as a count value I in the count memory 65.

Next, S73 and S74 are executed to generate print dot image data for the text data presently stored in the text memory 61. Then, the print mechanism PM performs printing processes on the print tape 19 based on the print dot image data.

When numbering processes are to be performed (i.e., S75 is YES), an increment process control (refer to FIG. 10) is executed (S76).

Figure 10:
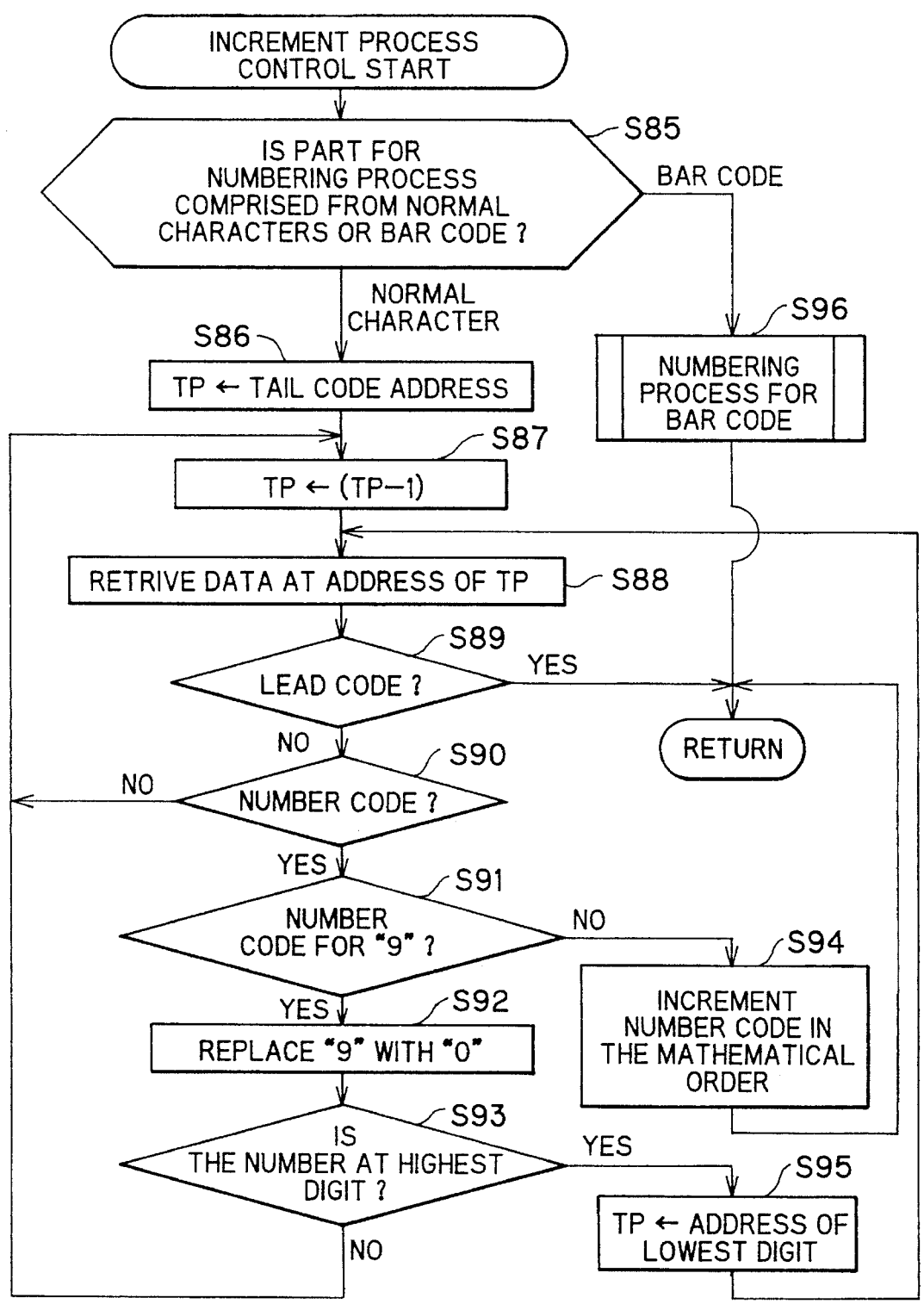
FIG. 10 schematically shows a flow chart of incrementing process control routine.

As shown in FIG. 10, if the lead code and the tail code are set for the normal character string, that is, not from bar code data, stored in the text memory 61, the address of the tail code (refer to TP0 of FIG. 15) is set to the pointer value TP (S86), at the start of this control (S85). Further, the pointer value TP is decremented by one (refer to TP1 of FIG. 15) (S87). Thus, the pointer TP indicates the tail character (lowest digit) of the part of the character string desired to be subjected to numbering process.

Next, the data stored at the address indicated by the pointer TP is retrieved (S88) from the text memory 61. If the data is not the lead code (i.e., S89 is NO), and if the data is not a number code (i.e., S90 is NO), the program returns to S87. On the other hand, if the retrieved data is a number code (i.e., S89 is NO and S90 is YES) and if the number code represents a number other than the number "9" (i.e., S91 is NO), the number represented by the number code is incremented, in accordance with the number arrangement order defined in the ASCII code. The number code is then replaced (S94) with the incremented number code, whereupon this control is ended and the program returns to S77 of the print process control of FIG. 9.

On the other hand, if the retrieved data is a number code (i.e., S89 is NO and S90 is YES) and the code is for the number "9" (i.e., S91 is YES), the code is replaced with a code for the number "0" (S93). Then, if the number is not at the highest digit of the number string (i.e., S93 is NO), S87 et seq are executed. On the other hand, if the number that is replaced with the number "0" is at the highest digit of the number string (i.e., S93 is YES), the address of the lowest digit is set to the pointer value TP (S95), and S88 et seq are executed. That is, when all the numbers constituting the number string are incremented to "0", the processes of S88 through S90, a NO determination in S91, and S94 increment the lowest digit of the number string into "1", and the incremented number string data are replaced with the original number string.

On the other hand, if the character string set to be subjected to the numbering process includes only alphabetic letters, S87 through S90 are repeatedly executed until the lead code is retrieved (i.e., S89 is YES). Then, this control is ended and the program returns to S77 of FIG. 9.

In the S77, the count value I of the number of the numbering processes is decremented by one. During this print process control, while the resultant count value I does not reach the number "0" (i.e., S78 is NO), the program goes into standby until the print mechanism completes printing operations (i.e., S79 is NO). When the printing operations are completed (i.e., S79 is YES), S73 et seq are executed again for printing the incremented character string presently stored in the text memory. When the count value I is reduced to the number "0" (i.e., S78 is YES) and printing operations are completed (i.e., S80 is YES), this control is ended, and the program returns to S11 of FIG. 5.

Figure 23:
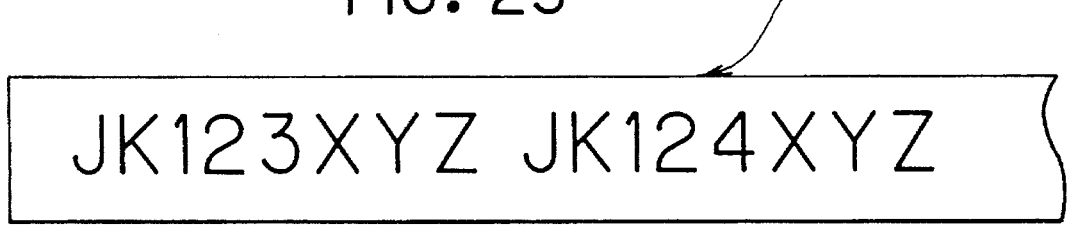
FIG. 23 illustrates an example of a tape printed with incremented character strings.

For example, assume now that the character string shown in FIG. 15 is stored in the text memory 61, and the number string "1 2 3" is set as the character string to be subjected to the numbering process. When the target number for the numbering process is set to "2", the character string "J K 1 2 3 X Y Z" and a character string "J K 1 2 4 X Y Z", which is the result of the number string "1 2 3" being incremented by one, are serially printed into labels on the print tape 19 as shown in FIG. 23.

On the other hand, assume now that the bar code data, indicative of the character string "A B C 1 2" shown in FIG. 16 for example, has been stored in the text memory 61 as the text data, that the bar code data is collectively set to be subjected to the numbering process, and that the target number for the numbering process is set to "2". In other words, assume that the control proceeds such that S70 and S71 are YES, S72 through S74 are performed, and S75 is YES. In this case, incrementation process control is executed in the same way (S76), as described below.

As shown in FIG. 10, at start of this control (S85), if the bar code data is set to be subjected to the numbering process, a numbering process control for bar codes (refer to FIG. 11) is executed (S96).

Figure 11:
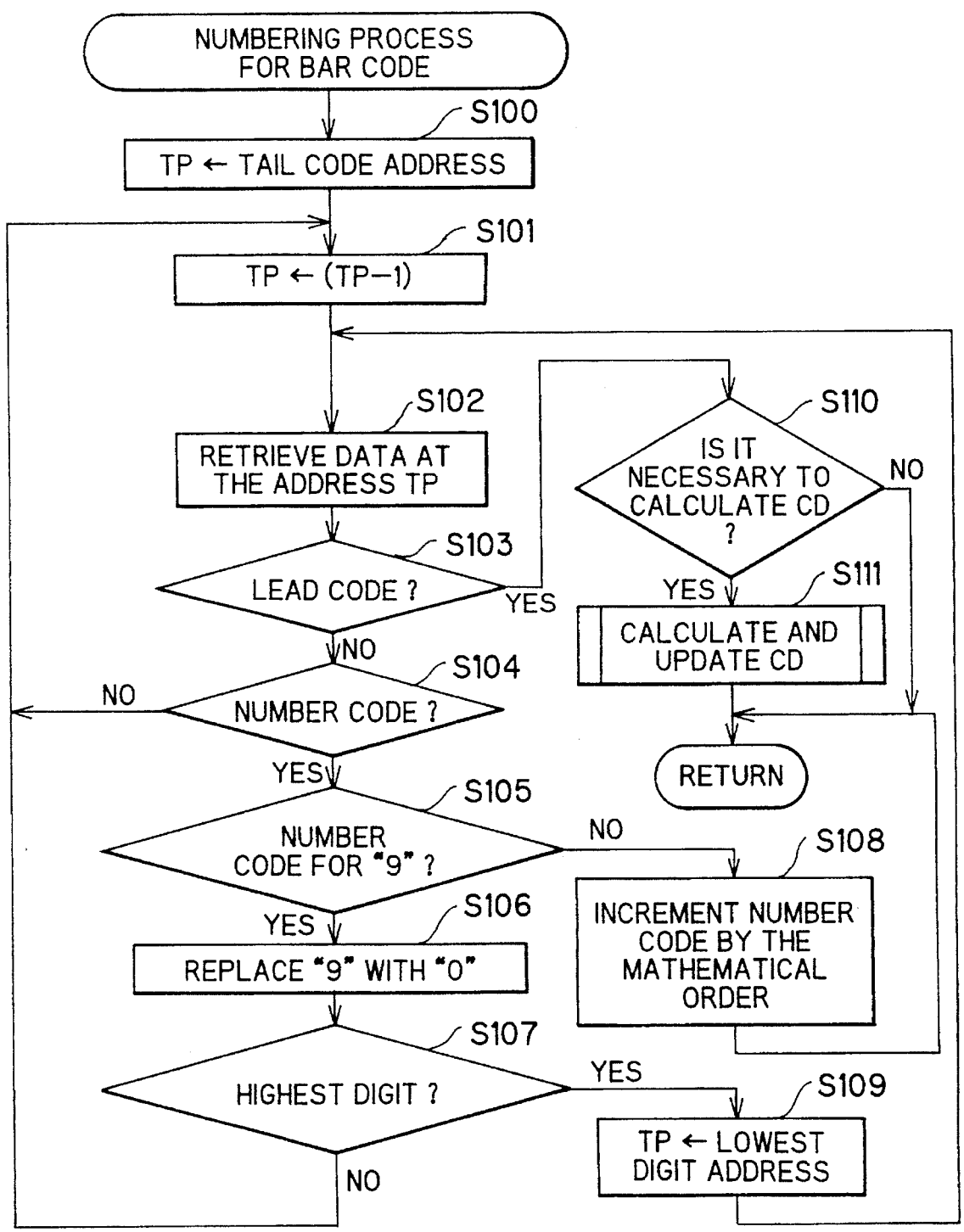
FIG. 11 schematically shows a flow chart of bar code incrementing process control routine.

As shown in FIG. 11, when this process control is started, first, the tail code address (refer to TP0 in FIG. 16) is set to the pointer value TP (S100). Then, this pointer value TP is decremented by one (refer to TP1 in FIG. 16) (S101). As a result, the pointer TP becomes to indicate the tail character code (end code) of the character string to be subjected to numbering.

Next, the data stored at the address indicated by the pointer TP is retrieved (S102) from the text memory 61. If this data is not the lead code (i.e., S103 is NO), and if this data is not a number code (i.e., S104 is NO), the program returns to S101. If the retrieved data is a number code (i.e., S103 is NO and S104 is YES), and if the number code is not the number code for the number "9" (i.e., S105 is NO), the number code is incremented in accordance with the number arrangement order defined in ASCII code (S108). Then, this control and incrementing process control are ended, and the program returns to S77 of the print process control of FIG. 9.

When the retrieved data is a number code (i.e., S103 is NO and S104 is YES) and the number code is for the number "9[|P]" (i.e., S105 is YES), the number code is replaced with the number code for the number "0" (S106). When the number is not the highest digit of the number string (i.e., S107 is NO), S101 et seq are executed. When the number code that has been replaced with the number code for "0" is the highest digit (i.e., S107 is YES), the address of the lowest digit of the number string is set in the pointer value TP (S109) and S102 et seq are executed. That is, when all the numbers constituting the number string are replaced to "0", the processes of the execution of S102 through S104, a NO determination in S105, and the execution of S108 increment the number of the lowest digit of the number string into "1".

When the lead code is retrieved (i.e., S102 and S103 are YES), if a check digit is determined as necessary to be calculated based on check digit information data CDI (i.e., S110 is YES), the check digit relating to the newly produced bar code data, which is constructed from the unincremented common character string (letter string) and the incremented countable character string (number string), is calculated. Thus calculated new check digit is stored (S111), whereupon this control is ended, and the program returns to S77 of FIG. 9.

It is noted that the manner of calculating the check digit value in S111 is predetermined depending on the standard format of the bar code. For example, when the bar code standard format "CODE-39" has been set, the calculation is attained in accordance with a well-known modulo 43 system. In the modulo 43 system, the following steps of calculation are attained.

1) All the characters constituting the character string of the bar code are converted to numeric values in accordance with a check digit conversion table which is predetermined for the modulo 43 system. All these numeric values are then totalled.

2) The total value obtained in 1) is divided by "43" to obtain a remainder value. It is noted that the total value obtained in 1) equal to or lower than "43", the number itself is treated as the remainder value.

3) The remainder value obtained in 2) is reconverted into a character, in accordance with the check digit conversion table. Thus obtained character is used as a check digit value for the bar code.

For example, the value of the check digit for "A B C 1 3" is ".(period)", while the value of the check digit for "A B C 1 2" is "-(hyphen)".

During execution of S77 et seq in this printing process control of FIG. 9, as explained previously, when the count value I representing the target number of numbering processes is reduced to reach "0" (i.e., S78 is YES) and when printing processes are completed (i.e., S80 is YES), this control is ended and the program returns to S11 of FIG. 5.

Figure 24:
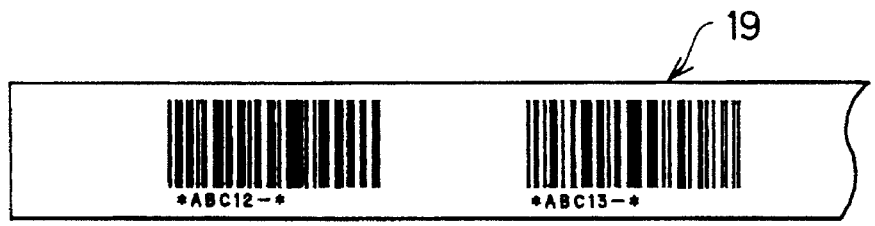
FIG. 24 illustrates an example of a tape printed with incremented bar codes.

Now assume that the character string for the bar code data shown in FIG. 16 has been stored in the text memory 61, and that the bar code data is totally set as the character string to be subjected to the numbering process. If the target number of the numbering processes is set to "2", as shown in FIG. 24, first a label with bar code data set to "* A B C 1 2 - *" is printed on the print tape 19. Then, as a result of the countable character string "1 2" (number string) in the bar code data being incremented, serially afterward a label with bar code data set to "* A B C 1 3 . *" is printed on the print tape 19.

When a key other than a printable key, the bar code key, the numbering setting key, or the print key is manipulated during this tape printing control of FIG. 5 (i.e., S11 is YES and S12 through S15 are NO), processes corresponding to the manipulated key are executed (S20) and the program returns to S11.

In the above description, the number string is described as the countable character string while the letter string is described as the common character string. However, in the present invention, the countable character string can be made to include not only numbers but also alphabetic letters so that numbering processes can be performed while incrementing the alphabetic letters in the arrangement order based on the code font, for example ASCII.

Next, a tape print device according to a second preferred embodiment of the present invention will be described.

The present embodiment provides a tape print device capable of printing both a normal character string and a bar code onto a single tape label. A plurality of pairs of the normal character strings and the bar codes are printed on the tape while being simultaneously incremented. Accordingly, it is possible to easily obtain a plurality of tape labels, on which the serially incremented pairs of normal character string and bar code are printed. The normal character string may be made from an article identification number and/or article category-representing letter string, and represents the content of the bar code. Such labels can be attached to various articles as identification labels. The labels can be read out not only by the bar code reader but also by human visual inspection. Accordingly, it becomes possible to enhance efficiency of management control of the articles.

The tape print device of the second embodiment includes an input unit; a bar code data conversion unit; a display; a data storage unit; a print data conversion unit; a print data storage unit; a target number setting unit; a numbering part setting unit; a bar cord incrementing unit; a number string incrementing unit; and a printing unit.

The input unit is for inputting letters and numbers and various commands. The bar code data conversion unit is for converting the inputted numbers into bar code data. The display is for displaying data indicative of a normal character string constructed from the inputted letters and numbers and the bar code data converted by the bar code data conversion unit from the inputted numbers. The data storage unit is for storing the data of the inputted normal character string and the bar code data converted by the bar code data conversion unit from the inputted numbers. The print data conversion unit is for converting the data of the normal character string and the bar code data stored in the data storage unit into dot pattern data for printing. The print data storage unit is for storing the dot pattern data. The target number setting unit is for setting a target number up to which both the normal character string data and the bar code data are desired to be serially incremented. The numbering part setting unit is for setting a part of each of the normal character string data and the bar code data desired to be serially incremented. The bar cord incrementing unit is for serially incrementing the bar code data stored in the data storage unit and for repeatedly replacing the bar code data with the incremented bar code data from an initial value up to the target number set by the target number setting unit. The number string incrementing unit is for serially incrementing the code data of the number string among the normal character string stored in the data storage unit and for repeatedly replacing the number string code data with the incremented number string code data from the initial value up to the target number set by the target number setting unit. The printing unit is controlled by the dot pattern data stored in the print data storage unit to repeatedly print both the normal character string and the bar code symbol up to the set target number.

A concrete example of this embodiment will be described below with reference to FIGS. 25 through 37.

This example is an application of the embodiment to a tape printer capable of printing on a print tape both a bar code produced through a JAN (Japan Article Number) bar code standard format and a character string representative of the bar code and constructed from characters, such as alphabetic letters, numbers and symbols.

The overall structure of the tape printer of this example is the same as that of FIG. 2. The structure of the print mechanism PM employed in the tape printer of this example is also the same as that of FIGS. 3A and 3B.

Figure 25:
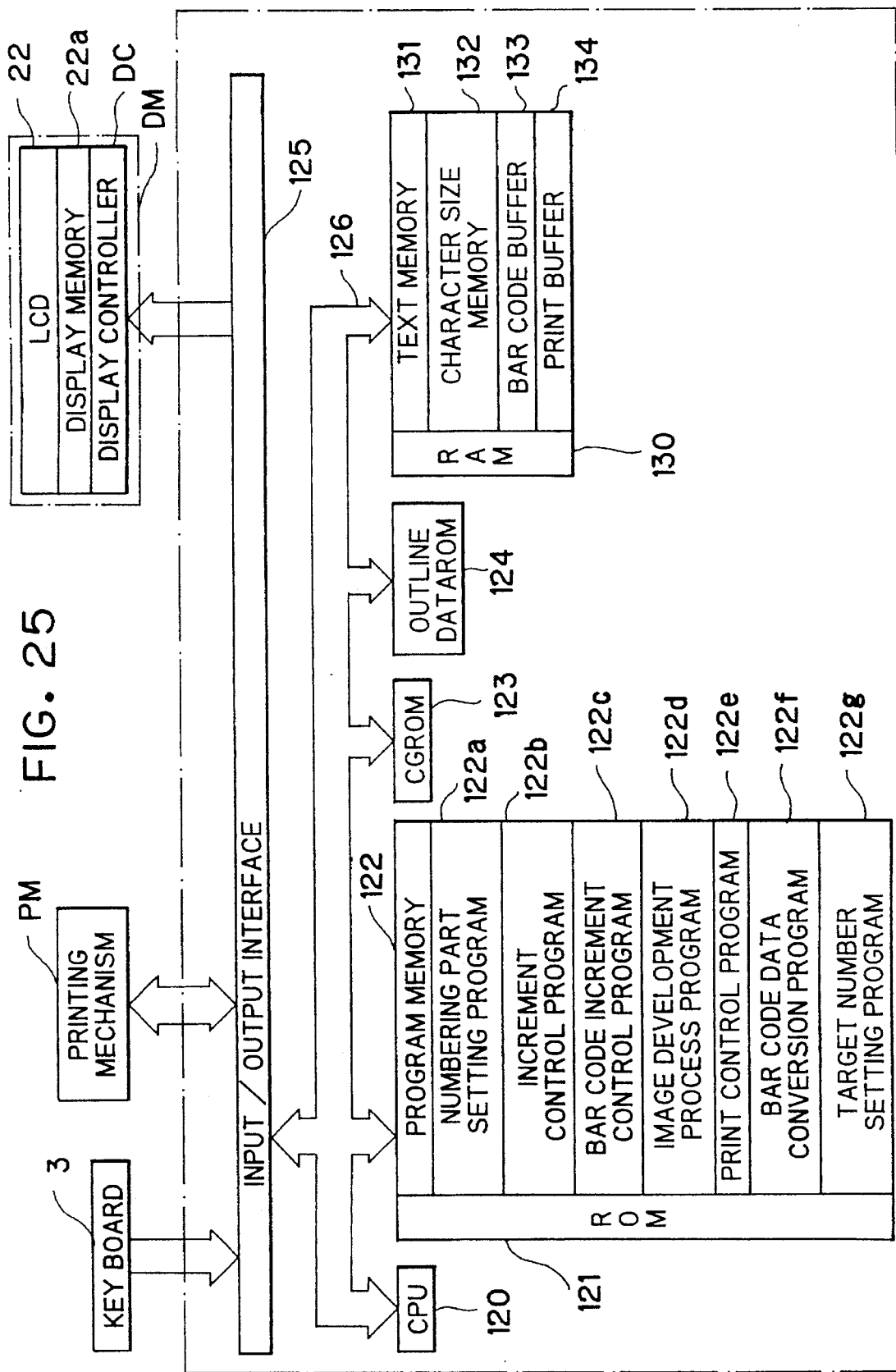
FIG. 25 is a block diagram of a control system of a tape printer of a second embodiment of the present invention.

The control system of the tape printer 1 of this example is structured as shown in the block diagram of FIG. 25.

A controller C of this example includes a CPU 120, a ROM 121, a CGROM 123, an outline data ROM 124, a RAM 130, and an input/output interface 125. A bus line 126 is provided for connecting the CPU 120, the ROM 121, the CGROM 123, the outline data ROM 124, and the RAM 130 with one another and for connecting them to the input/output interface 125. The ROM 121 is provided with a program memory 122 for storing various programs. The CPU 120 is for performing various calculations based on various programs stored in the ROM 121. The CGROM 123 stores dot pattern data for displaying each of a plurality of characters, correspondently to a plurality of character code data inputtable through operation of the character keys. The outline data ROM 124 stores outline data representative of outlines of a plurality of characters, correspondently to the plurality of character code data inputtable through operation of the character keys. The outline data for each character is stored for each of the plurality of typefaces (such as Gothic type and Ming-cho type). The outline data ROM 124 further stores outline data representative of outlines of a plurality of bar code modular data. The RAM 130 is for temporarily storing the results calculated by the CPU 120.

The program memory 122 in the ROM 121 stores therein: a numbering part setting process control program 122a for setting a part of each of a normal character string and a bar code desired to be subjected to a numbering process; an increment process control program 122b for incrementing the part of the normal character string set in the numbering part setting process control program 122a; a bar code increment process control program 122c for incrementing the part of the bar code set in the numbering part setting process control program 122a; an image development process control program 122d for converting the outline data corresponding to the code data stored in a text memory 131 into dot pattern data and for developing the dot pattern data into a print buffer 134; a print process control program 122e for sequentially reading out the dot pattern data stored in the print buffer and for printing the dot pattern on the print tape 19 with the use of the print mechanism PM; a bar code data conversion process control program 122f for converting the numeric data, inputted at the time of bar code data inputting process, into bar code modular data; a target number setting process control program 122g for setting a target number up to which the numbering process is desired to be repeatedly performed; and other various types of programs, such as a display control program.

In the present embodiment, the bar code data conversion process control program 122f is for converting thirteen numerical data (thirteen digit number including twelve digit number of characters and one digit number of modular check character) into bar code modular data through the JAN (Japan Article Number) standard format. More specifically, the thirteen digit number is converted into: three modules of data for a left-hand guard bars; forty-two (42) modules of data for left six data characters; five modules of data for center bar; thirty-five (35) modules of data for right five data characters; seven modules of data for modulo check character; three modules of data for right-hand guard bar, and the like.

The RAM 130 is formed with various types of work areas: the text memory 131; an image pointer: a count memory; a data pointer; a character size memory 132; a bar code buffer 133; a print buffer 134, and the like. The text memory 131 is for temporarily storing text data composed of a normal character string data inputted through the manipulation of the character keys and the number keys and a bar code data inputted from the bar code buffer 133. The image pointer is for storing a leading address of the text data stored in the text memory 131 in order to read out the text data therefrom and to produce the dot pattern data in the image development process control program 122d. The content in the image pointer is referred to as a data pointer IP. The count memory is for decrementing the target number in the increment process control programs 122b and 122c. The content in the count memory is referred to as a count value M. The data pointer is for storing a trailing end address of the bar code data stored in the text memory 131 for reading out the bar code data therefrom. The content in the data pointer is referred to as a data pointer value DP. The character size memory 132 is for storing the set character size. The bar code buffer 133 is for storing bar code data of the effective character string of the thirteen digit number (effective digit number) for bar code printing. The print buffer 134 is for storing the print data.

The input/output interface 125 is connected to the key board 3 and a display mechanism DM. When the character keys and/or the number keys on the key board 3 are depressed during a normal character input mode, character code data of the inputted character string are stored in the text memory 131. Simultaneously, the character string is displayed on the display 22 through the display controller DC and the display memory 22a. When the number keys on the key board 3 are depressed during a bar code input mode, the inputted number data are converted into the bar code data and stored in the text memory 131. Simultaneously, the bar code data is displayed on the display 22 through the display controller DC and the display memory 22a.

The input/output interface 125 is further connected to the printing mechanism PM. When the print key P on the key board 3 is depressed, the dot pattern data stored in the print buffer 134 is printed on the tape 19 through the print mechanism PM.

Figure 26:
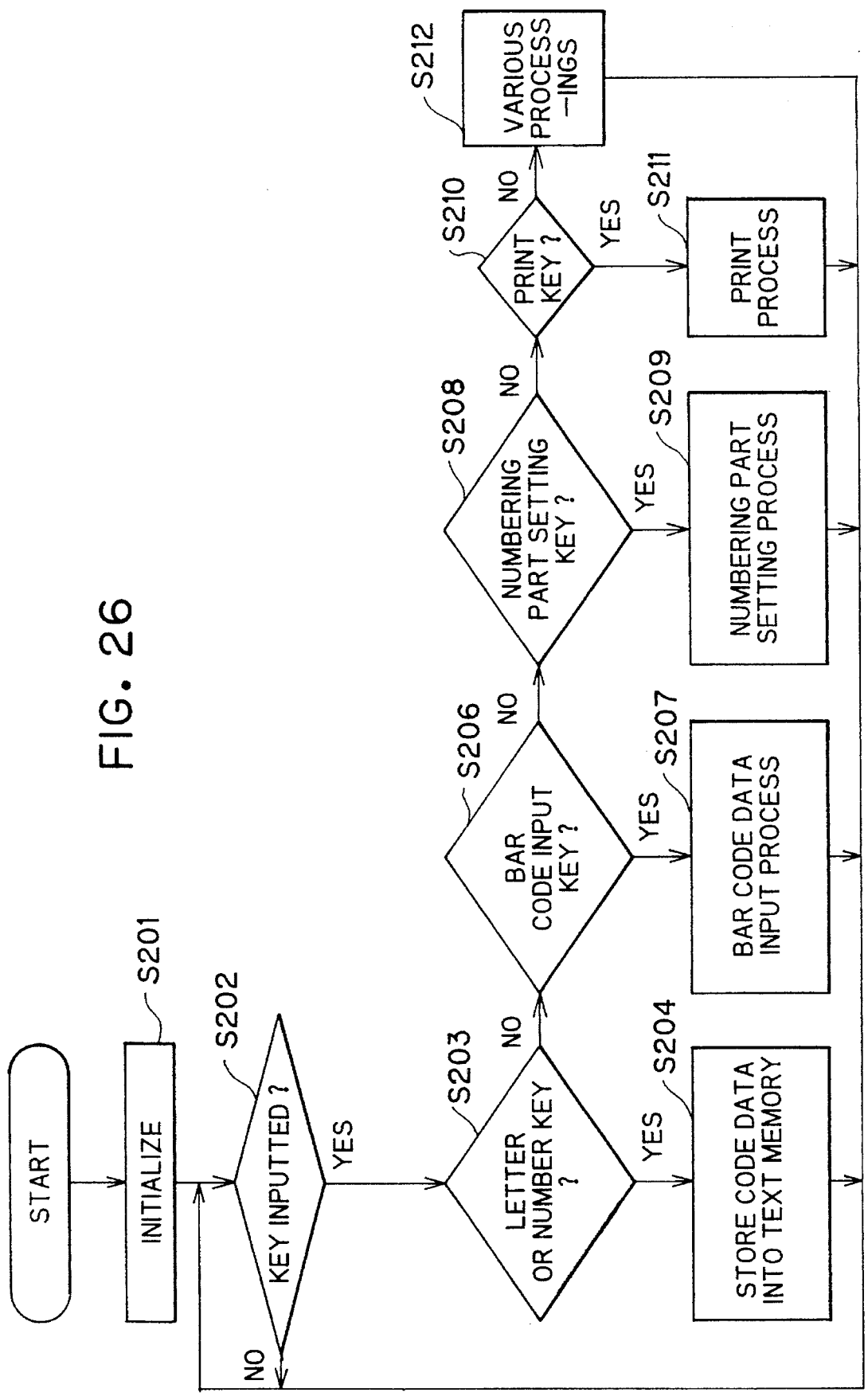
FIG. 26 schematically shows a flow chart of a basic operation of the tape printer of the second embodiment.

An explanation of the routine for basic operation performed by the tape printer 1 having the above structure will be provided based on the flowchart shown in FIG. 26. FIG. 26 is a flowchart illustrating the basic operation of the tape print device.

When the power source is turned on, the text memory 131 and the like are initialized in S201. As a result, the tape print device 1 is set into a normal character input mode. Then, it is judged in S202 whether or not any key is manipulated. While no key is manipulated (i.e., S202 is No), control waits input of some key. When some key is manipulated (i.e., S202 is Yes), it is judged in S203 whether or not the inputted key is either one of an alphabetic letter key and a number key.

If the inputted key is either one of the letter key and a number key (i.e., S203 is Yes), character code data corresponding to the inputted key is stored in the text memory 131 in S204. When a plurality of keys are inputted, a plurality of character code data corresponding to the plural inputted keys are stored in the text memory in the order that the corresponding keys are inputted. Simultaneously, the display controller DC controls to display the inputted content on the display 22.

When the bar code data input key is inputted (i.e., S206 is Yes), the tape print device 1 is switched from the normal character input mode into a bar code input mode, whereupon a bar code data input process is started in S207, as will be described later.

On the other hand, if the inputted key is not the bar code data input key (S206 is No), it is judged in S208 whether or not the inputted key is a numbering part setting key for setting a part of the inputted data desired to be subjected to a numbering process. If the inputted key is the numbering part setting key (S208 is Yes), a numbering part setting control program 122a is executed in S209, as will be described later. On the other hand, if the inputted key is not the numbering part setting key (S208 is No), it is further judged in S210 whether or not the inputted key is the print key. If the inputted key is the print key (S210 is Yes), a print control program 122e is executed in S211, as will be described later. On the other hand, if the inputted key is not the print key (S210 is No), a process corresponding to the inputted key is executed in S212.

Figure 27:
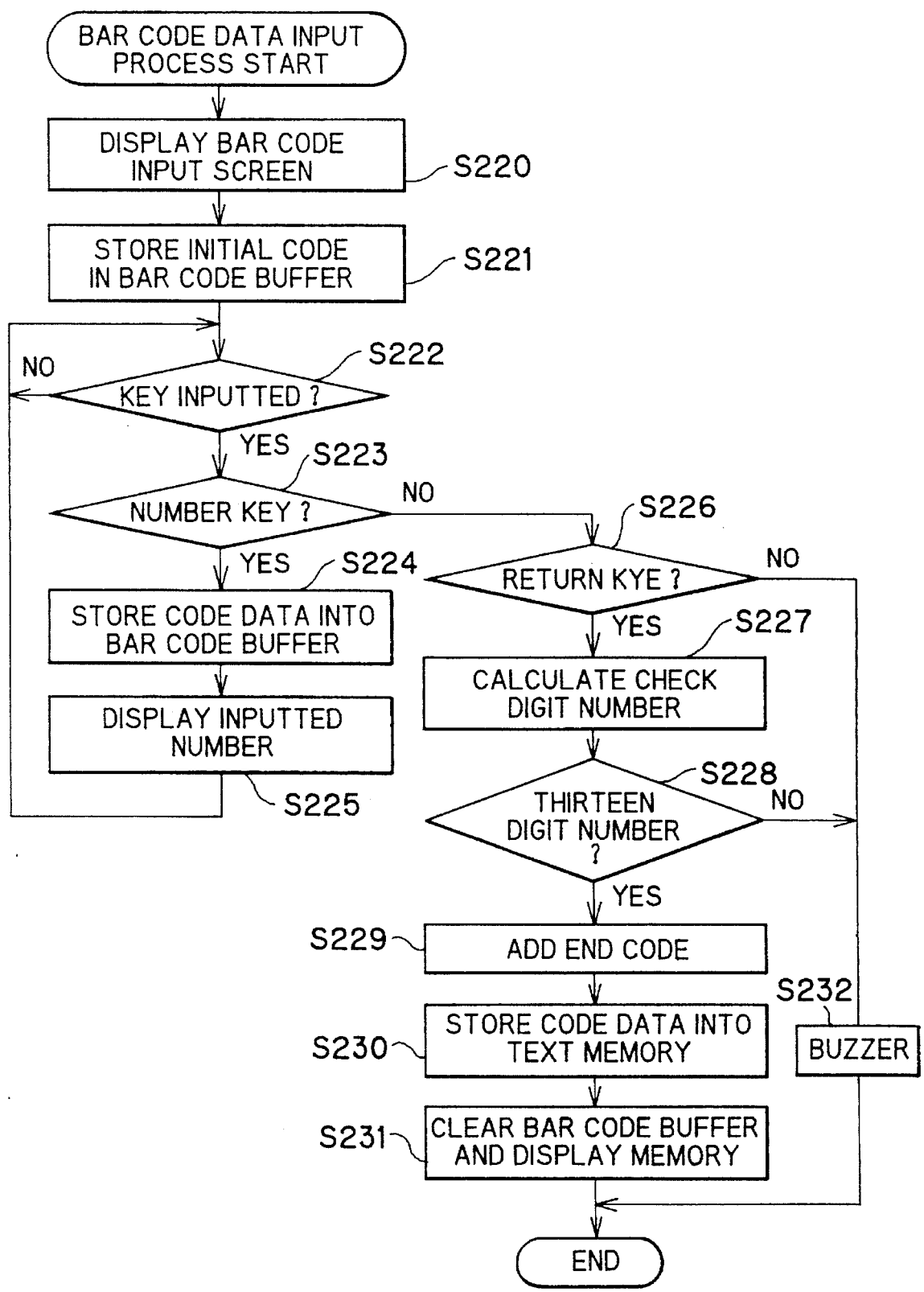
FIG. 27 schematically shows a flow chart of a bar code input process control program.

First, the bar code data input process of S207 will be described below with reference to FIGS. 27 and 34. FIG. 27 is a flowchart showing the bar code data input process program, and FIG. 34 shows the displaying state of the display 22 at the time of the bar code input process.

As shown in FIG. 34, when this control starts, the display 22 is first switched into a bar code input screen in S220. An initial mark SM is indicated at the left lead position of the bar code input screen. An initial code for the bar code is then stored in the bar code buffer 133 in S221. When some number key is inputted (S222 and S223 are Yes), number code data corresponding to the inputted number key is stored in the bar code buffer 133 in S224. Then, dot pattern data corresponding to the number code data is read out from the CGROM 123 to be outputted to the display memory 22a. As a result, the dot pattern representative of the inputted number is displayed on the display 22 at the position indicated by the cursor K. Then, the cursor K moves rightwardly in S225. The display 22 is then controlled by the display controller DC to display a simplified bar code symbol BS at the right side of the cursor K. The control then returns to S222.

On the other hand, if the inputted key is not any number key (S223 is No) but is the return key (S226 is Yes), a check digit number is calculated based on the number code data presently stored in the bar code buffer memory 133 according to a "Modulo 10" system predetermined for the JAN bar code standard format and stored in the ROM 121. A number code data corresponding to the calculated result is also stored in the bar code buffer 133 in S227.

Then, it is judged in S228 whether or not the bar code buffer 133 now entirely stores the number code data representative of thirteen digit number (effective digit number for the JAN bar code standard format). If the bar code buffer 133 completely stores the number code data of the thirteen digit number (S228 is Yes), an end code is added to the bar code buffer 133 in S229, and the code data stored in the bar code buffer 133 are entirely stored into the text memory 131 in S230. Then, the bar code buffer 133 and the display memory 22a are cleared in S231, and this program ends.

At this time of control, the initial mark SM, the bar code symbol BS and the cursor K are displayed on the display 22 following the stored text of the normal character string.

On the other hand, if the number code data of the thirteen digit number are not stored in the bar code buffer 133 (S228 is No), a warning buzzer sounds off in S232.

Figure 28:
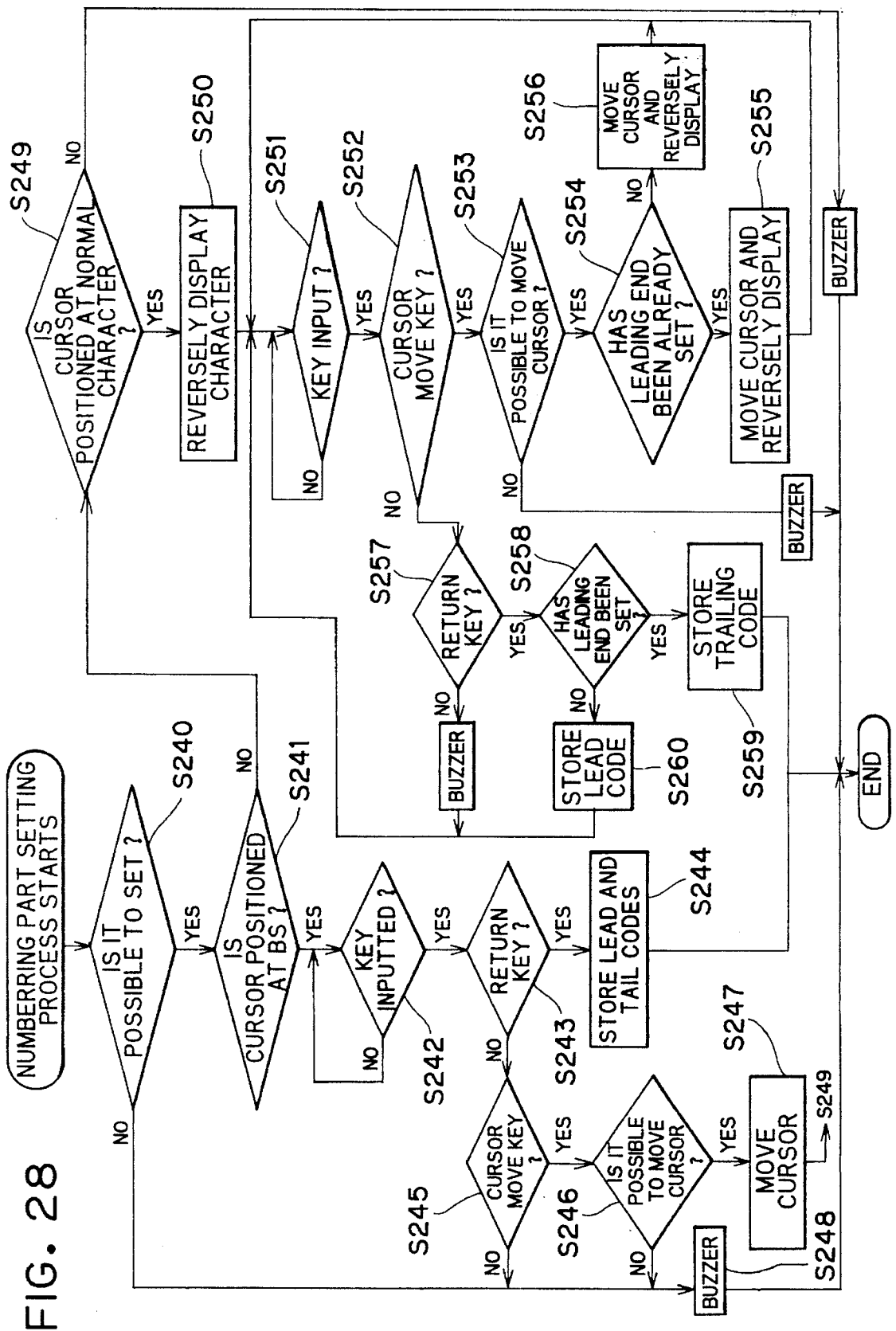
FIG. 28 schematically shows a flow chart of a numbering part setting process control program.

Next, the numbering part setting process of S209 will be described below with reference to FIGS. 28 and 35. FIG. 28 is a flowchart showing the numbering part setting process control program. FIG. 35 illustrates a display state of the display 22 at the time of setting the numbering part.

When this control is started, it is first judged in S240 whether or not it is possible to set a part of the data stored in the text memory 131 to be subjected to a numbering process. If parts of both of the bar code data and the normal character data stored in the text memory have been already set for the numbering process, it is impossible to further set any part of the bar code data and the normal character data (S240 is No), and therefore, a warning buzzer sounds off in S248. On the other hand, if it is possible to set a part of the data for the numbering process (S240 is Yes), it is further judged in S241 whether or not the cursor K is presently positioned at the bar code symbol BS. If the cursor K is positioned at the bar code symbol BS (S241 is Yes), the control waits for manipulation of some key (S242 is No). When some key is manipulated (S242 is Yes) and if the manipulated key is the return key (S243 is Yes), a lead code and a tail code representing a leading end and a trailing end of the part of the data to be subjected to the numbering process are stored, in S244, into the text memory 131 at positions immediately before and after the initial code and the end code of the bar code data in S244. Thus, the bar code data is always entirely subjected to the numbering process in the same manner as the first embodiment.

On the other hand, if the inputted key is not the return key (S243 is No) but is the cursor move key (S245 is Yes), it is judged in S246 whether or not it is possible to move the cursor K. If it is possible to move the cursor K (S246 is Yes), the cursor K is moved on the display 22 in S247. Then, the process control proceeds to S249, from which a part of the character string is set for the numbering process. On the other hand, if the inputted key is not the cursor move key (S245 is No) or if it is impossible to move the cursor K (S246 is No), the warning buzzer sounds off in S248.

On the other hand, if the cursor K is not positioned at the bar code symbol BS (S241 is No), it is further judged in S249 whether or not the cursor K is positioned at one normal character (letter or number) displayed on the display 22. If the cursor K is positioned at the normal character (S249 is Yes), the character is reversely displayed in S250. If the cursor K is not located at the character, the warning buzzer sounds off to end the control.

Contrary to the bar code data, the character code data are capable of being partly subjected to the numbering process. A part of the character string represented by the character code data is set for the numbering process, as described below.

After the reversely-displaying process of S250, the control waits for input of some key (S251 is No). When some key is inputted (S251 is Yes), it is judged in S252 whether or not the inputted key is the cursor move key. If the inputted key is the cursor move key (S252 is Yes), it is judged in S253 whether or not it is possible to move the cursor K. If it is judged that it is impossible to move the cursor K (S253 is NO), the warning buzzer sounds off. If it is judged that it is possible to move the cursor K (S253 is Yes), it is further judged in S254 whether a leading end has already been set for the part to be subjected to the numbering process. If the leading end has already been set (S254 is Yes), the cursor K is moved on the display 22 so that the characters located between the leading end and the position where the cursor K moves to reach are reversely displayed in S255. The program then returns to S251.

On the other hand, if the leading end has not yet been set (S254 is No), the cursor K is moved on the display 22, and a character (letter or number) located at the position where the cursor K moves to reach is reversely displayed in S256. The process then returns to S251.

On the other hand, in S251, if the inputted key is not the cursor move key (S252 is No), it is judged in S257 whether or not the inputted key is the return key (S257). If the inputted key is not the return key (S257 is No), the warning buzzer sounds off. On the other hand, if the inputted key is the return key (S257 is Yes), it is judged in S258 whether or not the leading end has already been set. If the leading end has not yet been set (S258 is No), the leading end is produced at the position where the cursor K is presently located. As a result, a lead code is stored in the text memory 131 at a position immediately before the code data corresponding to the character (letter or number) presently indicated by the cursor K in S260. As a result, the leading end of the part of the character string to be subjected to the numbering process is set. Then, the control returns to S251 to set the trailing end of the part for the numbering process.

On the other hand, if the leading end has already been set (S258 is Yes), the trailing end is produced at the position where the cursor K is presently located. Then, a tail code is stored in the text memory 131 at a position immediately after the code data corresponding to the character (letter or number) presently indicated by the cursor K in S259. Thus, the part of the character string to be subjected to the numbering process is set between the lead end and the trail end, and the numbering part setting program 122a ends.

Figure 29:
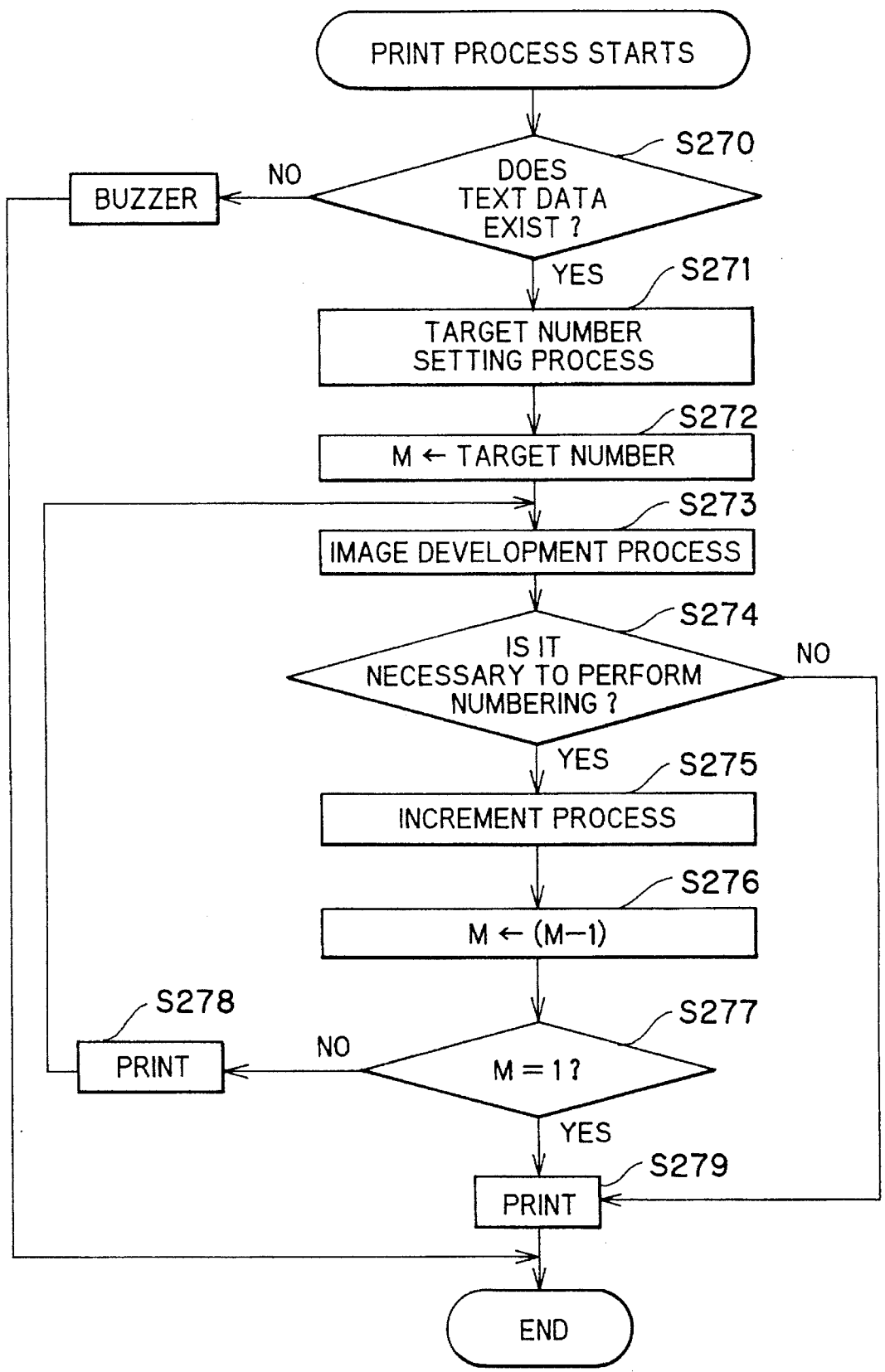
FIG. 29 schematically shows a flow chart of a print control program.

The data thus inputted through the above-described programs are printed on the print tape through the print process program 122e (S211), as will be described below with reference to FIG. 29. FIG. 29 is a flowchart of the print process program 122e.

When the print key is depressed, it is judged in S270 whether or not any text data is stored in the text memory 131. If any text data is not stored in the text memory (S270 is NO), the warning buzzer sounds off. On the other hand, if the text data is stored (S270 is Yes), the target number setting process control program 122g is executed in S271 for setting a target number up to which the numbering processes are desired to be repeatedly performed.

Figure 30:
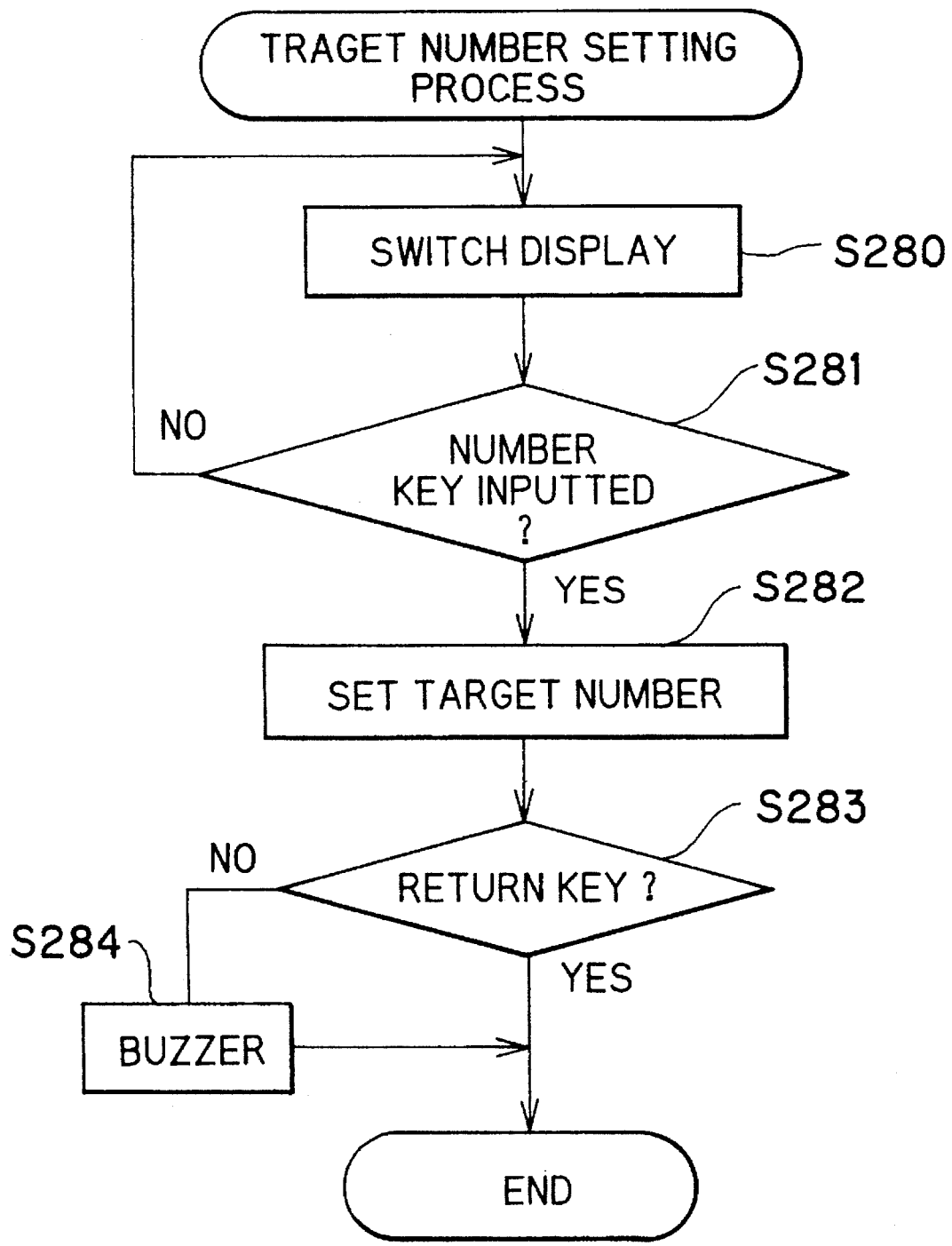
FIG. 30 schematically shows a flow chart of a target number setting program.

The target number setting program 122g will be described below with reference to FIGS. 30 and 36. FIG. 30 is a flowchart of the target number setting program, and FIG. 36 illustrates a displaying state of the display 22 at the time of the target number setting process.

When the target number setting process starts, the display 22 is switched into a screen shown in FIG. 36 in S280. The control then waits for the input of the numeric character key (S281 is No). If the numeric character key is inputted (S281 is Yes), the target number, up to which the numbering processes are desired to be repeatedly performed, is set as the inputted number, in S282. When the return key is depressed (S283 is Yes), the target number is finally set, and the program ends. On the other hand, if a key other than the return key is inputted (S283 is No), the warning buzzer sounds off in S284, and the program ends.

When the target number setting program 122g ends in S271 of FIG. 29, the set target number is set in the count memory as a count value M in S272. Afterwardly, an image development process is executed in S273 for developing the text data in the text memory 131 into the print buffer 134.

Figure 31:
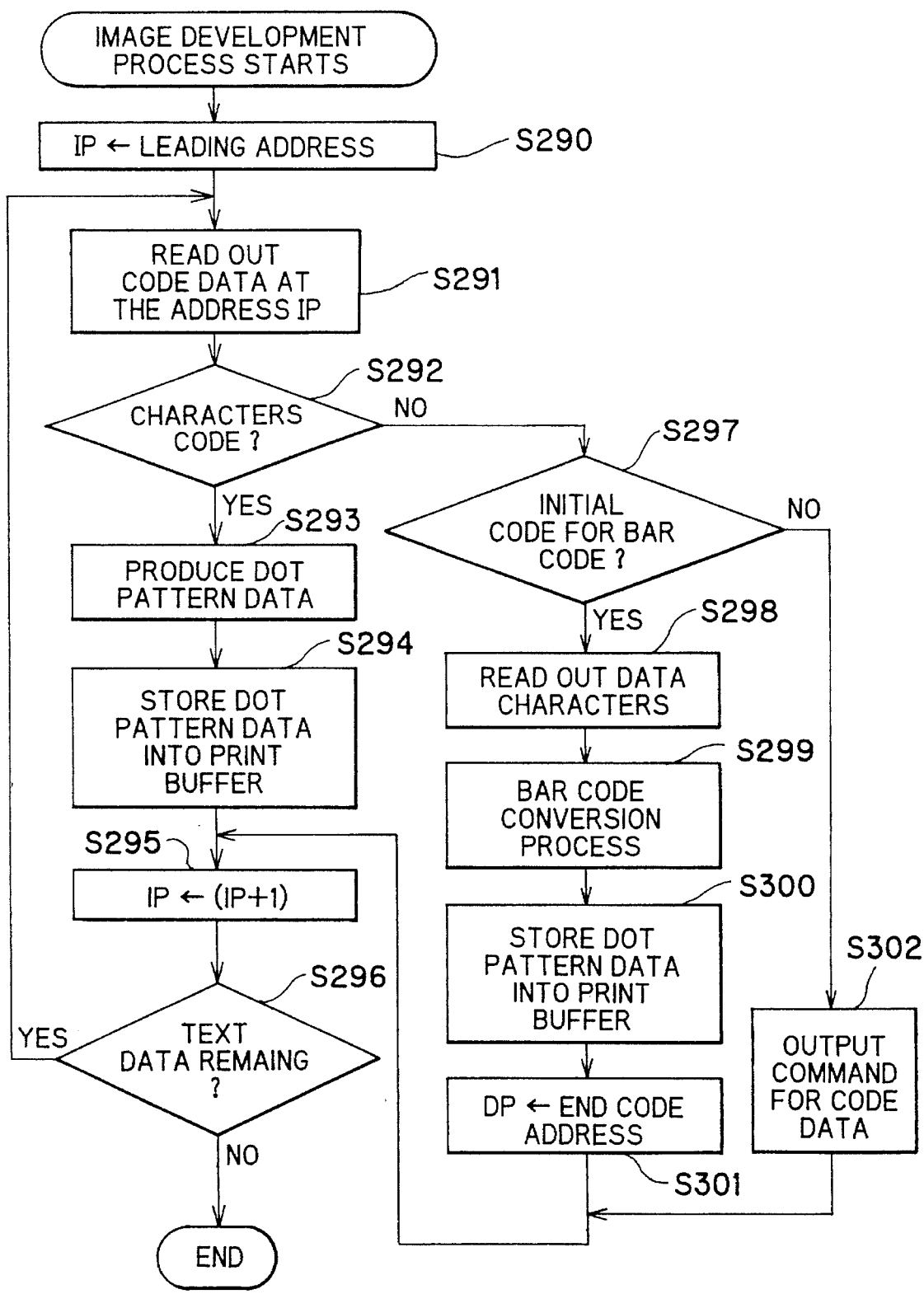
FIG. 31 schematically shows a flow chart of an image development process control program.

The image development process program (S273) will be described below with reference to FIG. 31. FIG. 31 is a flowchart of the image development process control program.

When the image development process control program starts, a leading address in the text memory 131 is set to the image pointer value IP in S290. Then, the code data stored at the address indicated by the image point value IP is read out in S291. Then, it is judged in S292 whether or not the read out code data is a normal character code. If the read out code data is a normal character code (S292 is Yes), a magnification rate is calculated in accordance with the set character size. An outline data stored in the ROM 24 and corresponding to the read out code data is subjected to a magnification process with the use of the calculated magnification rate. Then, the magnified outline data is processed into dot pattern data (print data) in S293 and stored in the print buffer 134 in S294. Then, the image pointer value IP is incremented by one in S295. Then, it is judged in S296 whether or not any text data remains unprocessed in the text memory 131. If some text data remains unprocessed in the text memory 131 (S296 is Yes), the process returns to S291. On the other hand, if no text data remains unprocessed in the text memory 131 (S296 is No), the image development process program ends.

On the other hand, if the code data indicated by the image point value IP and read out from the text memory 131 in S291 is not a normal character code (S292 is No), it is judged in S297 whether or not the read out code data is the initial code data for a bar code data. If the read out code data is the initial code data for the bar code data (S297 is Yes), the data characters of the thirteen digit number, stored in the text memory from the address next to the initial code toward the address of the end code, are read out from the text memory in S298. In S299, thus read out data characters are then converted into bar code modular data of the bar code standard format (for example, JAN) through the bar code data conversion process control program 122f. Then, dot pattern data of the bar code is produced based on the bar code modular data so that the obtained bar code symbol may have a set size.

Thus obtained dot pattern data for the bar code are stored in the print buffer 134 in S300. The address of the text memory at which the end code is stored is set to the data pointer DP in S301, and then, the program proceeds to S295.

On the other hand, if the code data indicated by the image pointer value IP and read out from the text memory is not the bar code initial code (S297 is No), a command corresponding to the read out code data, the space data, for example, is stored in the print buffer 134 in S302. Then, the program proceeds to S295.

When the above-described image development process of S273 ends, as shown in FIG. 29, it is judged in S274 whether or not it is necessary to perform the numbering process. It is determined necessary to perform the numbering process (S274 is Yes) when the lead code and the tail code are stored in the text memory 131 for setting some part of the data to be subjected to the numbering process and when the number equal to or higher than two (2) is set as the target number up to which the numbering process should be repeatedly performed. In this case, the incrementing process control program is executed in S275. On the other hand, if it is determined unnecessary to perform the numbering process (S274 is No), the incrementing process control program is not executed, but the content in the print buffer 134 is simply printed on the tape 19 in S279.

Figure 32:
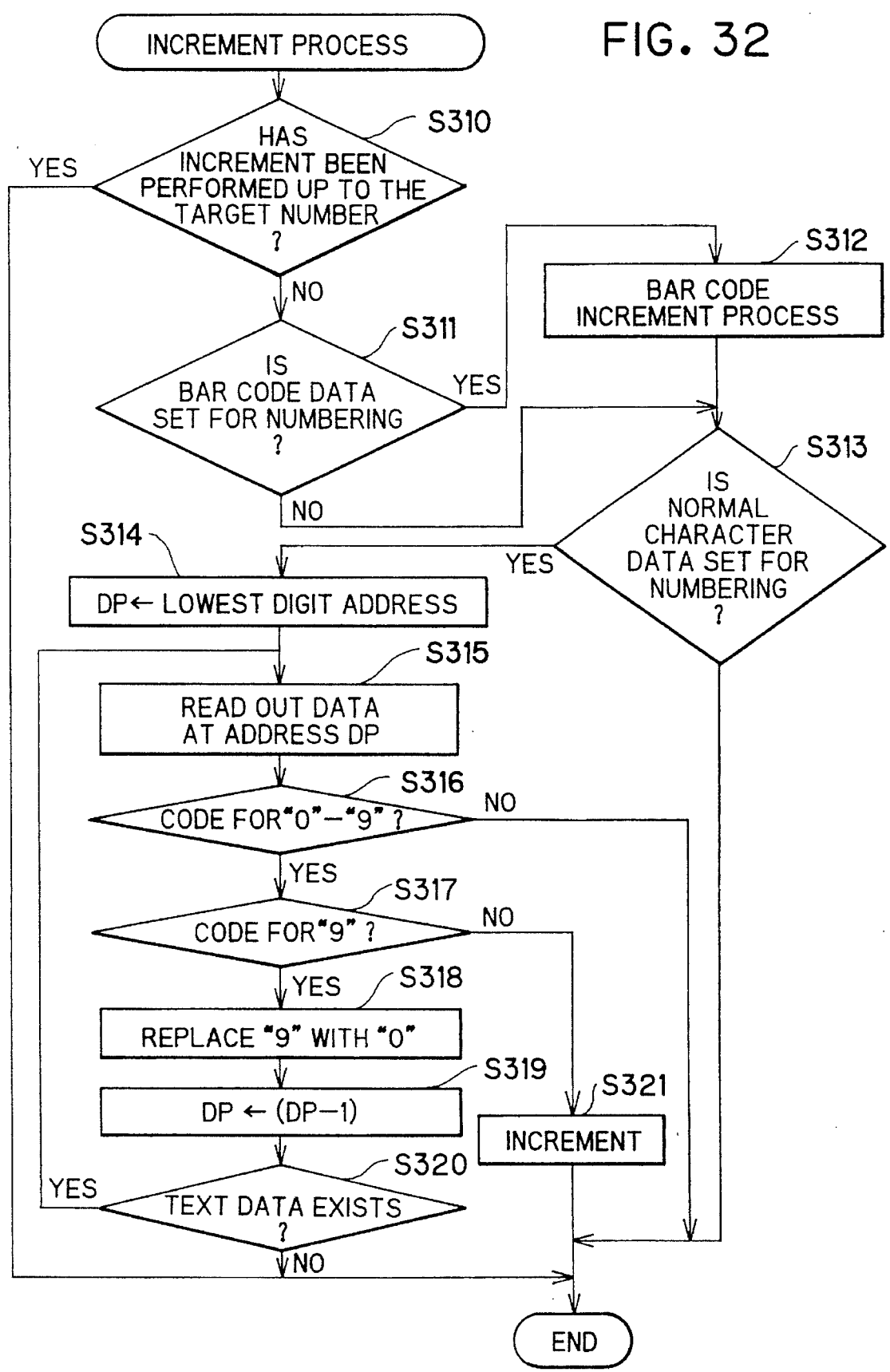
FIG. 32 schematically shows a flow chart of an increment process control program for a normal character string.

The increment process control program (S275) will be described below with reference to FIG. 32. FIG. 32 is a flowchart of the increment process control program 122b for the code data of the normal characters (letters and/or numbers).

In the increment process control, it is first judged in S310 whether or not the increment operation has been performed up to the set target number. If the increment operation has been completed up to the set target number (S310 is Yes), the increment process control program 122b ends. On the other hand, if the increment operation has not yet been performed up to the set target number (S310 is No), it is judged in S311 whether or not the lead code is stored at the bar code data in the text memory 131. If the lead code is stored at the bar code data in the text memory 131 (S311 is Yes), the increment process 122c for the bar code data is performed in S312. On the other hand, if no lead code is stored at the bar code data in the text memory and therefore no part of the bar code data is set to be subjected to the numbering process (S311 is No), the program proceeds to S313.

Figure 33:
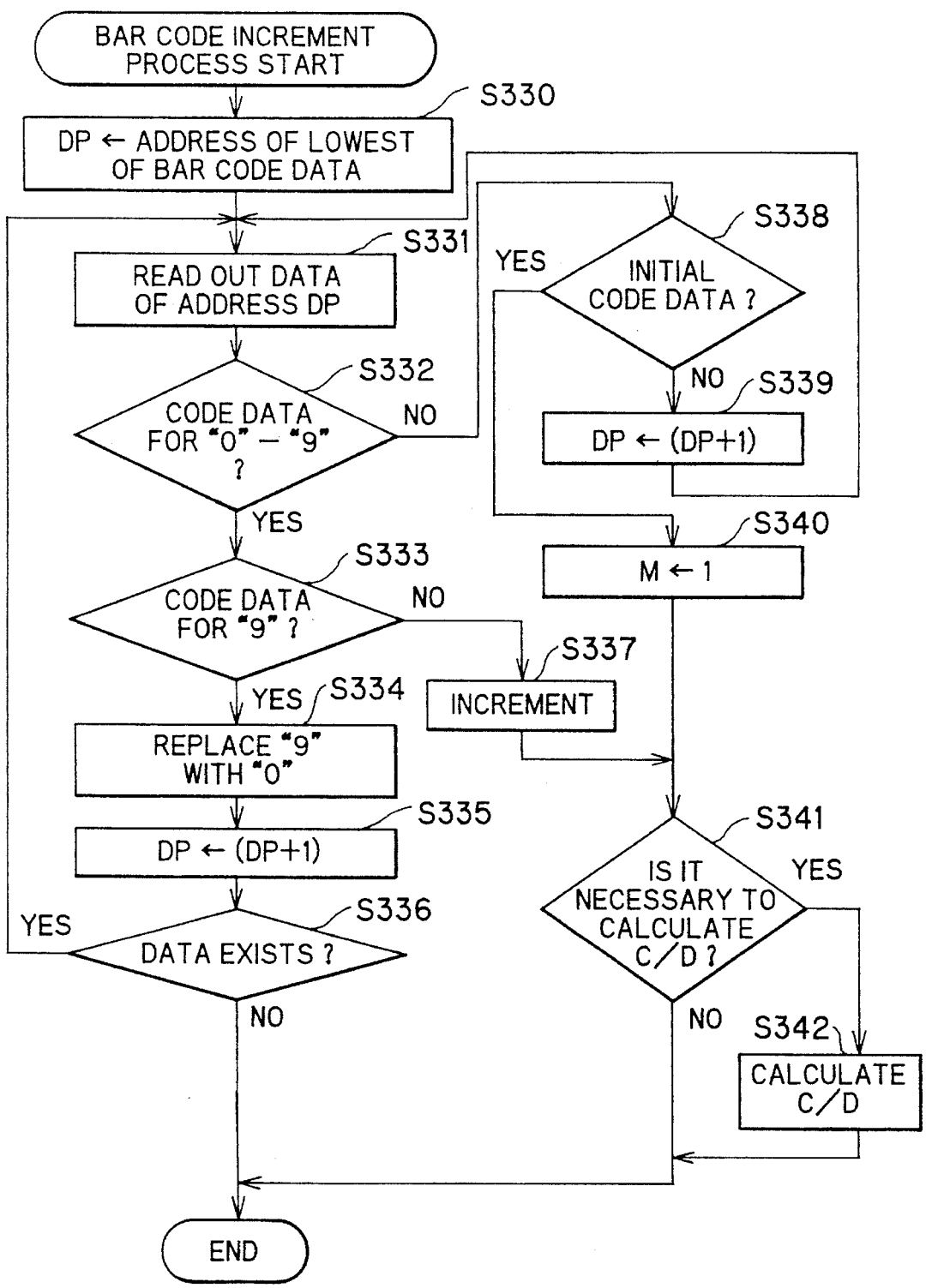
FIG. 33 schematically shows a flow chart of an increment process control program for a bar code data.

The increment process control 122c for the bar code data (S312) will be described below with reference to FIG. 33. FIG. 33 is a flowchart of the increment process control program 122c for the bar code data.

First, an address in the text memory 131, at which the code data of the numerical character at the lowest digit of the twelve digit number of the data characters for the bar code data is stored, is set to the data pointer value DP in S330. Then, the code data of the numerical character stored at the address indicated by the data pointer value DP is read out from the text memory in S331. Then, it is judged in S332 whether or not the read out code data is either one of the code data for the numerical characters of "0" to "9". If the read out code data is either one of the code data for the numerical characters of "0" to "9" (S332 is Yes), it is further judged in S333 whether the read out code data is the code data for the number "9".

If the read out code data is the code data for the number "9" (S333 is Yes), the code data indicated by the data pointer value DP is replaced with the code data for the number "0" in S334. Then, the data pointer value DP is incremented by one (1) in S335. Then, it is judged in S336 whether or not any code data for the bar code data remains unprocessed in the text memory 131. If some code data remains unprocessed in the text memory (S336 is Yes), the program returns to S331. On the other hand, if no code data remains unprocessed in the text memory (S336 is No), the program ends.

In S333, if the read out code data is not the code data for the number "9" (S333 is No), the code data indicated by the data pointer value DP is incremented, in accordance with the predetermined number arrangement order, in S337. the program then proceeds to S341.

On the other hand, if the code data read out in S332 is not any of the code data for the numbers "0" to "9" (S332 is No), it is judged in S338 whether or not the read out code data is the initial code data for the bar code data. If the read out code data is the initial code data (S338 is Yes), the count value is incremented by one in S340. Then, it is judged in S341 whether or not the selected bar code print format sets the check digit (C/D) ON, that is, whether or not it is necessary to calculate the check digit data.

If the selected bar code format sets the check digit ON (S341 is Yes), a check digit is calculated based on the updated character data of the twelve digit number which is newly obtained through the above-described increment process. Then, the calculated check digit data is added to the character data of the twelve digit number as the thirteenth digit number in S342, and the program ends. On the other hand, if the selected bar code format sets the check digit OFF (S341 is No), i.e., if it is unnecessary to calculate the check digit number, the program ends.

In S338, if the read out data is not the initial code data (S338 is No), the data pointer value DP is incremented by one in S339, and the program returns to S331.

Thus, the increment process control program 122c for the bar code data is ended, and the process proceeds to S313 of FIG. 32.

In S313, it is judged whether any part of the normal character string stored in the text memory 131 is set to be subjected to the numbering process. If the lead code and the tail code are stored in the text memory to set some part of the normal character string for the numbering process (S313 is Yes), the address in the text memory, at which the lowest digit or the tailing end of the part of the character string set for the numbering process is stored, is set to the data pointer value DP in S314. Then, the code data stored at the address indicated by the data pointer value DP is read out from the text memory in S315.

It is judged in S316 whether or not the read out code data is the code data representative of any of the numbers "0" to "9". If the code data represents any of the numbers "0" to "9" (S316 is Yes), it is further judged in S317 whether or not the code data represents the number "9".

If the read out code data represents the number "9" (S317 is Yes), the code data indicated by the data pointer value DP is replaced with a code data representative of the number "0" in S318. Then, the data pointer value DP is incremented by one in S319. Then, it is judged in S320 whether or not any code data of character remains unprocessed in the text memory. If some code data of character remains unprocessed in the text memory (S320 is Yes), the program returns to S315. On the other hand, if no code data of character remains unprocessed in the text memory (S320 is No), the program ends.

In S317, if the read out code data is not the code data for the number "9" (S317 is No), the code data indicated by the data pointer value DP is incremented to be updated, in accordance with the number arrangement order in S321. Then, the program ends. If the read out code data is not any of the code data for the numbers "0" to "9" (S316 is No), the program also ends.

When the increment process control of S275 of FIG. 29 is thus completed, the count value M is decremented by one in S276, and it is judged in S277 whether the count value M reaches one (1).

When the count value M does not reach one (S277 is No), the content presently stored in the print buffer 134 is printed on the tape 19 in S278, and the process returns to S273, upon which the incremented data obtained through the increment process control is developed into the print buffer 134. On the other hand, when the count value M reaches one (S277 is Yes), it is judged that the numbering process has been completed up to the set target number. Accordingly, the content presently stored in the print buffer 134 is printed on the tape 19 in S279, and the print process control program 122e is ended.

The print tape thus printed with the content which has been stored in the text memory is fed out by the predetermined feed amount by the tape feed motor, and is cut off with the cutter into a label.

A concrete example of the above-described operation will be described below.

First, numeric character keys are operated to execute the steps S202 through S204 of FIG. 26 to input the number string "0 1 2". Then, the bar code input key, numeric character keys, and the return key are operated to execute the processes S202, S203, S206 and S207 to input the character code data "1 2 3 4 5 6 7 8 9 0 1 2 8" for a bar code into the bar code buffer 133. It is noted that the first twelve digit numbers "1 2 3 4 5 6 7 8 9 0 1 2" are inputted through the manipulation of the numeric character keys, but the thirteenth digit number "8" is calculated in the step S227 in FIG. 27 and inputted as a check digit number for the twelve digit numbers "1 2 3 4 5 6 7 8 9 0 1 2" through the well-known Modulo 10 method predetermined for the JAN bar code standard format.

Then, the numbering part setting key, the cursor move key, and the return key are manipulated to execute the steps S202, S203, S206, S208 and S209 so as to set the number string "0 1 2" and the bar code data to be subjected to the numbering process. When the print key is manipulated, the print process of S211 is performed. Then, the target number up to which the numbering process should be repeatedly performed is set to "9" in the step S271 of FIG. 29. Then, the character string and the bar code data are developed into dot pattern data, which are then stored in the print buffer 134. In the step S278, the dot pattern data are printed on the print tape, and the printed result shown in FIG. 37 (a) is obtained.

Figure 37:
FIGS. 37 (*a*) through (*d*) show examples of the tape labels obtained through the incrementing operation of the second embodiment.
Figure 37:
Figure 37:
Figure 37:

Then, in the step S275, the increment process is attained. As a result, the normal character string "0 1 2" is incremented into "0 1 3", and the bar code data is incremented into "1 2 3 4 5 6 7 8 9 0 1 3 5". It is noted that the twelve digit number "1 2 3 4 5 6 7 8 9 0 1 2" is incremented into the twelve digit number "1 2 3 4 5 6 7 8 9 0 1 3". The thirteenth digit number "5" is the check digit data for the twelve digit number "1 2 3 4 5 6 7 8 9 0 1 3". Thus obtained incremented data are then printed on the tape, as shown in FIG. 37 (b).

The increment process are repeatedly performed. After when the character string "0 1 9", and the bar code data "1 2 3 4 5 6 7 8 9 0 1 9 7" are printed, the character string data is further incremented through the steps S315-S321 of FIG. 32 into a character string "0 2 0", and the bar code data is further incremented through the steps S331-S342 of FIG. 33 into a bar code data "1 2 3 4 5 6 7 8 9 0 2 0 3". Then, the thus incremented data are printed on the tape, as shown in FIG. 37 (d).

As described above, according to the second embodiment, the normal character string and the bar code are incremented simultaneously according to the character string increment process program 122b and the bar code increment process program 122c, respectively, while they are printed onto the tape through the image development process program 122d and the print process program 122e. Accordingly, both the normal character string and the bar code are printed on the tape while being incremented simultaneously. Thus, a plurality of tape labels are easily obtained, on which a plurality of incremented pairs of bar codes and corresponding normal character strings are printed. Each label thus printed with the bar code and the normal character string representing the content of the bar code can be read out by both the bar code reader and the operator. Therefore, attaching the labels, as identification labels, onto a plurality of articles can enhance the efficiency of management control of the articles.

While the invention has been described in detail with reference to specific embodiments thereof, it would be apparent to those skilled in the art that various changes and modifications may be made therein without departing from the spirit of the invention, the scope of which is defined by the attached claims.

The present invention can be applied to a variety of tape printers that include a keyboard, display, printer, and the like and that are capable of printing bar codes, text, and the like on a tape-like print medium using a numbering function, a bar code print function, and the like.

The bar code standard format for producing the bar code can be freely selected in the present invention.

As described above, the tape print device of the present invention is provided with the print tape producing unit and the incrementing unit. Merely inputting bar code data that includes a common character string and a countable character string can print corresponding serially-incremented bar codes. More specifically, the countable character string is serially incremented and recorded. Bar codes reflecting the incrementation are printed. Incrementing the countable character string and printing the bar codes accordingly are repeated so that a plurality of numbered bar codes can be easily printed on tapes to form labels.

The tape print device of the present invention may further include the numbering setting unit for setting a character string to be subjected to the numbering processes. The numbering setting unit receives a predetermined setting command from the input unit and stores data for indicating start and stop positions of bar code data, which includes a common character string and a countable character string. Therefore, starts and stops need not be individually set each time bar code data is set. Processes for setting bar code data as the numbering character string are therefore simplified.

In the tape printer of the present invention, when the bar code data includes check digit data, the incrementing unit calculates the check digit data relating to the common character string and the countable character string. Also, the bar code data produced by incrementing the calculated check digit data is stored in the data memory means.

Therefore, even if the bar code standard has check digit data, numbering processes can be reliably performed on the bar code data. Regardless of whether check digit is present or absent, numbering processes can be performed on the bar code data. Therefore all-purposeness of the bar code can be increased.

What is claimed is:

1. A tape print device for printing bar codes on a print tape, the device comprising:

input means for inputting data indicative of a bar code desired to be printed on a tape;

data storage means for temporarily storing the inputted data, wherein the input means includes bar code mode input means for inputting data of a first character string constituted from a plurality of first characters indicative of a bar code desired to be printed on a tape, the first character string including a common first character string part and a countable first character string part, the data storage means temporarily storing the inputted data of the first character string;

increment means for serially incrementing at least a part of the data stored in the data storage means at lest one time, in accordance with a predetermined order, to thereby produce at least one incremented data indicative of at least one incremented bar code, the thus produced at least one incremented data being stored in the data storage means, wherein the increment means serially increments data of the countable first character string part of the first character string stored in the data storage means, in accordance with the predetermined order, to thereby produce data of at least one incremented first character string indicative of at least one incremented bar code, the thus produced data of at least one incremented first character string being stored in the data storage means;

print data generating means for producing print data for the desired bar code and the at lest one incremented bar code, based on the data stored in the data storage means;

printing means for receiving the print data and for printing images of the desired bar code and the at least one incremented bar code on a print tape; and check digit data calculating means for calculating a check digit data based on the common first character string part and the countable first character string part of the inputted data of the first character string, the calculated check digit data being stored in the data storage means together with the inputted data of the first character string, the check digit data calculating means further calculating another check digit data relating to the common first character string part and the incremented countable first character string part of each of the at least one incremented first character string, the thus calculated another check digit data being stored in the data storage means together with the corresponding incremented first character string.

2. A tape print device of claim 1, further comprising target number setting means for setting a target number up to which the increment means is desired to serially increment at least a part of the data stored in the data storage means, wherein the increment means serially increments at least a part of the data stored in the data storage means, the target number times, to thereby produce the target number of serially-incremented data indicative of the target number of serially-incremented bar codes.

3. A tape print device of claim 1, wherein the increment means includes bar code incrementing means for repeatedly incrementing at least a part of data, indicative of a bar code, presently stored in the data storage means to produce an incremented data indicative of an incremented bar code and for replacing the data presently stored in the data storage means with the thus produced incremented data, every time after when the print data generating means completes producing print data based on the data presently stored in the data storage means.

4. A tape print device of claim 1, further comprising display means for displaying a screen for indicating that the input means for displaying a screen for indicating that the input means inputs data of the desired bar code.

5. A tape print device for printing bar codes on a print tape, the device comprising:

input means for inputting data of a character string indicative of a bar code desired to be printed on a print tape and data of a normal character string desired to be printed on the print tape together with the bar code and various commands;

bar code data conversion means for converting the data of the inputted character string into bar code data;

display means for displaying the inputted reference character string and the bar code data converted by the bar code data conversion unit from the inputted character string;

data storage means for storing the data of the inputted reference character string and the bar code data converted by the bar code data conversion unit from the inputted character string;

print data conversion means for converting the data of the reference character string and the bar code data stored in the data storage unit into dot pattern data for printing;

print data storage means for storing the dot pattern data;

target number setting means for setting a target number up to which both the reference character string data and the bar code data are desired to be serially incremented;

numbering part setting means for setting at least a part of each of the reference character string data and the bar code data desired to be serially incremented;

bar code incrementing means for serially incrementing the bar code data presently stored in the data storage unit and for replacing the bar code data with the incremented bar code data, in repetition from an initial number up to the target number of times set by the target number setting unit;

reference character string incrementing means for serially incrementing at least a part of the data of the reference character string stored in the data storage means and for replacing the reference character string data with the incremented reference character string data, in repetition from the initial number up to the target number of times set by the target number setting unit; and printing means controlled by the dot pattern data stored in the print data storage unit to repeatedly print both the reference character string and the bar code symbols up to the set target number of times.

6. A tape print device for printing bar codes on a print tape, the device comprising:

input means for inputting data indicative of a bar code desired to be printed on a tape;

data storage means for temporarily storing the inputted data;

increment means for serially incrementing at least a part of the data stored in the data storage means at least one time, in accordance with a predetermined order, to thereby produce at least one incremented data indicative of at least one incremented bar code, the thus produced at least one incremented data being stored in the data storage means;

print data generating means for producing print data for the desired bar code and the at least one incremented bar code, based on the data stored in the data storage means; and printing means for receiving the print data and for printing images of the desired bar code and the at least one incremented bar code on a print tape, wherein the input means includes bar code mode input means for inputting data of a first character string constituted from a plurality of first characters indicative of a bar code desired to be printed on a tape, the first character string including a common first character string part and a countable first character string part, the data storage means temporarily storing the inputted data of the first character string, wherein the increment means serially increments data of the countable first character string part of the first character string stored in the data storage means, in accordance with the predetermined order, to thereby produce data of at least one incremented first character string indicative of at least one incremented bar code, the thus produced data of at least one incremented first character string being stored in the data storage means, wherein the input means further includes character mode input means for inputting data of second character string constituted from a plurality of second characters desired to be on a tape together with the desired bar code, the second character string including a common second character string part and a countable second character string part, the data storage means temporarily storing a pair of the inputted data of the second character string and the inputted data of the first character string for the desired bar code, and wherein the increment means serially increments each of the data of the countable first character string part of the first character string and the data of the countable second character string part of the second character string which are both stored in the data storage means, in accordance with the predetermined order, to thereby produce a pair of data of at least one incremented first character string and data of at least one incremented second character string, a pair of the thus produced data of at least one incremented first character string and at least one incremented second character string being stored in the data storage means, the print data generating means producing print data for the pair of the desired bar code and the desired second character string and the at least one pair of the incremented bar code and the incremented second character string, based on the data stored in the data storage means, the printing means receiving the print data and printing images of the pair of the desired bar code and the desired second character string and the at least one pair of the incremented bar code and the incremented second character string on a print tape.

7. A tape print device of claim 6, wherein the increment means includes bar code/character incrementing means for repeatedly incrementing the countable first character string part and the countable second character string part of a pair of data of the first character string and the second character string which are presently stored in the data storage means to thereby produce a pair of incremented data indicative of an incremented first character string and an incremented second character string and replace the pair of data presently stored in the data storage means with the thus produced pair of incremented data, every time after when the print data generating means completes producing print data based on the pair of data presently stored in the data storage means.

8. A tape print device of claim 6, wherein the common first character string part is constructed from a letter string and the countable first character string part is constructed from a number string.

9. A tape print device of claim 6, further comprising countable second character string part setting means for setting data indicative of start and stop positions of the countable second character string part of the second character string stored in the data storage means, the data for the start and stop positions being stored in the data storage means, the increment means incrementing the countable second character sting part determined in accordance with the stored data for the start and stop positions.

10. A tape print device for printing bar codes on a print tape, the device comprising:

input means for inputting data indicative of a bar code desired to be printed on a tape and various commands, the data indicative of the bar code including data of a common character string and a countable character string;

data storage means for temporarily storing the inputted data indicative of the desired bar code;

displaying means for receiving the data stored in the data storage means and for displaying the data;

print data generating means for receiving the data from the data storage means and for producing dot image data for printing;

printing means for receiving the dot image data and for printing a dot image on a print tape; and incrementing means for incrementing the data of the countable character string every time when the printing means performs a printing operation for printing the dot image based on the data from the data storage means, the incrementing means updating the data of the countable character string stored in the storage means with the data of the incremented countable character string, the incrementing means repeatedly incrementing the countable character string of the data stored in the data storage means, while the print data generating means repeatedly generates dot image data for the data stored in the data storage means to cause the printing means to repeatedly print the data onto a tape, to thereby print the print tape with a plurality of bar codes, with their countable character strings being serially incremented, wherein the incrementing means includes check digit data calculating means for calculating a check digit data relating to the common character string and the incremented countable character string, the check digit data thus calculated for the incremented countable character string and the common character string being stored in the data storage means together with the data for the common character string and the incremented countable character string.

11. A tape print device of claim 10, further comprising setting means for receiving a predetermined command for executing the incrementing processes and for setting data for indicating start and stop positions of the data of the bar code, between which both the common character string and the countable character sting are located, the data for the start and stop positions being stored in the data storage means.

12. A tape print device for printing bar codes on a print tape, the device comprising:

input means for inputting data indicative of a bar code desired to be printed on a tape;

data storage means for temporarily storing the inputted data;

increment means for serially incrementing only a part of the data, indicative of at least one number, stored in the data storage means at least one time, in accordance with a predetermined order, to thereby produce at least one incremented data indicative of at least one incremented bar code, the thus produced at least one incremented data being stored in the data storage means;

print data generating means for producing print data for the desired bar code and the at least one incremented bar code, based on the data stored in the data storage means; and printing means for receiving the print data and for printing images of the desired bar code and the at least one incremented bar code on a print tape.

13. A tape print device of claim 12, wherein the data indicative of the bar code includes data of a letter string and a number string, wherein the incrementing means includes judging means for judging whether each of the data indicative of the bar code is data of either a letter and a number, the incrementing means incrementing only the data of the number judged by the judging means.

* * * * *